(12) United States Patent
Kojima et al.

(10) Patent No.: US 8,029,122 B2
(45) Date of Patent: Oct. 4, 2011

(54) RECORDING INK, INKJET RECORDING METHOD AND INKJET RECORDING APPARATUS

(75) Inventors: Mariko Kojima, Komae (JP); Kiyofumi Nagai, Machida (JP); Akihiko Gotoh, Atsugi (JP); Akiko Bannai, Atsugi (JP); Tomohiro Inoue, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 681 days.

(21) Appl. No.: 12/094,203

(22) PCT Filed: Sep. 12, 2007

(86) PCT No.: PCT/JP2007/068227
§ 371 (c)(1),
(2), (4) Date: May 19, 2008

(87) PCT Pub. No.: WO2008/032864
PCT Pub. Date: Mar. 20, 2008

(65) Prior Publication Data
US 2008/0254228 A1    Oct. 16, 2008

(30) Foreign Application Priority Data
Sep. 15, 2006   (JP) .................................. 2006-251589

(51) Int. Cl.
*G01D 11/00*   (2006.01)

(52) U.S. Cl. ........ 347/100; 347/95; 347/101; 106/31.13

(58) Field of Classification Search ............. 347/95, 347/96, 101, 100; 106/31.13, 31.6; 523/160, 523/161
See application file for complete search history.

(56) References Cited

U.S. PATENT DOCUMENTS

| | | | | | |
|---|---|---|---|---|---|
| 6,123,759 | A | * | 9/2000 | Mise et al. ............ | 106/31.9 |
| 2005/0054751 | A1 | * | 3/2005 | Namba et al. ............ | 523/160 |

FOREIGN PATENT DOCUMENTS

| CN | 1628157 A | 6/2005 |
|---|---|---|
| EP | 1 473 338 A1 | 11/2004 |
| EP | 1 479 732 A1 | 11/2004 |
| JP | 10 219165 | 8/1998 |
| JP | 11 199810 | 7/1999 |

(Continued)

OTHER PUBLICATIONS

Office Action issued Sep. 30, 2010, in China Patent Application No. 2007800028429 (with English-language Translation).

*Primary Examiner* — Manish S Shah
(74) *Attorney, Agent, or Firm* — Oblon, Spivak, McClelland, Maier & Neustadt, L.L.P.

(57) ABSTRACT

A recording ink containing at least: water; a water-soluble organic solvent; a surfactant; and a carbon black having a hydrophilic group on a surface thereof, wherein at least part of a terminal of the hydrophilic group on the carbon black is substituted with an alkali metal, wherein the carbon black releases humic acid in an aqueous dispersion of the carbon black, which is recovered from the recording ink, a concentration of the humic acid released in the aqueous dispersion containing 20% by mass of the carbon black of is expressed with a maximum absorbance at a wavelength of 230 nm to 260 nm, and the recording ink has the maximum absorbance of 5.0 to 20.0 at the wavelength of 230 nm to 260 nm.

18 Claims, 16 Drawing Sheets

FOREIGN PATENT DOCUMENTS

| | | |
|---|---|---|
| JP | 11 349309 | 12/1999 |
| JP | 2000 119571 | 4/2000 |
| JP | 2000 355159 | 12/2000 |
| JP | 3405817 | 3/2003 |
| JP | 3489289 | 11/2003 |
| JP | 2004 204079 | 7/2004 |
| JP | 2005 272705 | 10/2005 |
| JP | 2005272705 A * | 10/2005 |

* cited by examiner

RECORDING INK, INKJET RECORDING METHOD AND INKJET RECORDING APPARATUS

TECHNICAL FIELD

The present invention relates to recording ink appropriate for inkjet recording, an inkjet recording method and an inkjet recording apparatus.

BACKGROUND ART

A coloring agent for inkjet recording ink is mainly based on a dye, and there are disadvantages that the dye ink is inferior in water resistance and weather resistance and also easily oozes out on plain paper. In order to eliminate these disadvantages, such ink has been proposed that pigments, for example, carbon black, are used.

The pigment ink is excellent in water resistance and weather resistance and also able to record images which ooze out to a less extent but is inferior in fixing property, which is a problem. Therefore, an attempt has been made that various resins are added to improve the fixing property.

For example, Patent Literature 1 has described a recording solution which contains carbon black and a soap-free emulsion. In records obtained by using the above-described recording solution, a resin emulsion forms a film after drying of water resistance, but carbon black contained in the recording solution is dispersed by a surfactant and therefore does not have a hydrophilic group directly on the surface. There is found a disadvantage that the above-described recording solution dispersed by a surfactant is poor in dispensability due to detachment of the surfactant adsorbed on the surface of the pigment with the lapse of time and may easily increase in viscosity and cause aggregation.

Further, Patent Literature 2 has described a method in which hypohalogen is used to acid-treat carbon black. Since this method is able to introduce an aqueous dispersible functional group onto the surface by acid treatment of carbon black, the dispersion stability is better than that attained by using a surfactant. However, carbon black is known to generate humic acid due to acid treatment and the dispersion tends to decrease in pH with the lapse of time, thereby causing a decrease in dispersion stability and the deterioration of members inside an ink-used recording apparatus.

Still further, Patent Literature 3 has described an ink composition containing two or more types of resins in which a pigment that can be dispersed or dissolved in water without a dispersing agent is used. Carbon black which is contained in the above-described ink composition and can be dispersed or dissolved in water without a dispersing agent is acid-treated by using hypochlorous acid or ozone. Since there are provided no measures for the pH decrease with the lapse of time due to elusion of humic acid, the ink is not satisfactory in terms of storage stability.

In addition, Patent Literature 4 has described that attention is given to humic acid contained in acid-treated carbon black and where the concentration of humic acid is found to be one or lower in terms of the absorbance, there is provided an excellent feature of preventing clogging at a nozzle or a pen tip due to the development of solids. However, there is a problem that where humic acid is abundantly contained in a recording solution, pH is decreased with the lapse of time to deteriorate the storage stability.

[Patent Literature 1] Japanese Patent (JP-B) No. 3489289
[Patent Literature 2] JP-B No. 3405817
[Patent Literature 3] Japanese Patent Application Laid-Open (JP-A) No. 2004-204079
[Patent Literature 4] JP-A No. 11-349309

DISCLOSURE OF INVENTION

An object of the present invention is to provide a recording ink excellent in fixing property and image density on a recording medium, also excellent in prolonged storage stability of ink and capable of forming a high-quality image not only on plain paper or paper exclusively used for inkjet printing but also on coated paper for commercial printing poor in water absorption, and an inkjet recording method as well as an inkjet recording apparatus.

In order to solve the above problem, the present inventor and others have diligently conducted research, finding that humic acid released from carbon black is contained into ink at a predetermined quantity to increase the ink viscosity on water evaporation, by which the carbon black undergoes a quick aggregation on a recording medium to form an image, thereby providing a high image density.

It has been found that a pH buffering agent is formulated into ink, thereby making it possible to retain the storage stability thereof, although a humic acid-containing recording ink tends to decrease in pH with the lapse of time.

Further, in recent years, it has been desired that since inkjet printing does not require plate-making procedures to attain an easy printing and water-based ink is lower in environmental impact, such ink is used to make a high-quality printing for commercial use such as offset printing and gravure printing. Since paper used in offset printing and gravure printing is coated with inorganic pigments such as calcium carbonate and kaoline or not provided with a water absorbing layer as provided on paper exclusively used for inkjet printing, it is inferior in absorption of water-based ink. It has been found that in the recording ink of the present invention, a coloring material undergoes a quick aggregation on a recording medium to effect drying, thus making it possible to make a high-quality recording on the recording medium poor in absorption of the water-based ink.

The following are means for solving the above problem:

<1> A recording ink containing at least: water; a water-soluble organic solvent; a surfactant; and a carbon black having a hydrophilic group on a surface thereof, wherein the carbon black releases humic acid in an aqueous dispersion of the carbon black, which is recovered from the recording ink, a concentration of the humic acid released in the aqueous dispersion containing 20% by mass of the carbon black is expressed with a maximum absorbance at a wavelength of 230 nm to 260 nm, and the recording ink has the maximum absorbance of 5.0 to 20.0 at the wavelength of 230 nm to 260 nm.

<2> The recording ink according to <1>, wherein a content of the carbon black is from 5% by mass to 15% by mass with respect to the total amount of the recording ink.

<3> The recording ink according to any of <1> or <2>, wherein the recording ink has a ratio B/A of from 5.0 or more to less than 550 when the recording ink has a water evaporation rate of 34% by mass to 41% by mass relative to a total mass of the recording ink, where A is an initial viscosity of the recording ink and B is a viscosity after water evaporation.

<4> The recording ink according to any one of <1> to <3>, further containing a pH buffering agent.

<5> The recording ink according to <4>, wherein the pH buffering agent is at least one organic pH buffering agent selected from Good's buffer solutions.

<6> The recording ink according to any one of <1> to <5>, wherein the carbon black having a hydrophilic group has a volume average particle size of from 60 nm to 200 nm at the time being dispersed in water.

<7> The recording ink according to any one of <1> to <6>, further containing resin fine particles having a volume average particle size of from 50 nm to 200 nm.

<8> The recording ink according to any one of <1> to <7>, wherein at least a part of a terminal of the hydrophilic group on the carbon black is substituted with an alkali metal.

<9> The recording ink according to <8>, wherein a quantity of the alkali metal contained in the recording ink is from 100 ppm or more to 1500 ppm or less.

<10> The recording ink according to any one of <1> to <9>, wherein the recording ink has a viscosity of 6 mPa·s to 20 mPa·s at 25° C.

<11> An inkjet recording method including at least: applying a stimulus to the recording ink as defined in any one of <1> to <10>, and ejecting the recording ink from a recording head so as to form an image on a recording medium, wherein the recording head is configured to have an ink discharge opening on a face of a nozzle plate, and to have an ink repellent layer formed on the face of the nozzle plate where the ink discharge opening is placed.

<12> The inkjet recording method according to <11>, wherein the stimulation is at least one selected from the group consisting of heat, pressure, vibration and light.

<13> The inkjet recording method according to any of <11> or <12>, wherein the ink repellent layer contains either a fluorine-based material or a silicone-based material.

<14> The inkjet recording method according to any one of <11> to <13>, wherein the ink repellent layer has a surface roughness Ra of 0.2 μm or less.

<15> The inkjet recording method according to any one of <11> to <14>, wherein the ink repellent layer is formed so to have an opening along with the ink discharge opening, and the opening of the ink repellent layer is formed so that a cross-sectional area of a face perpendicular to a center line of the opening becomes gradually larger as a distance from the face of the nozzle plate increases in a vicinity of the opening.

<16> The inkjet recording method according to any one of <11> to <15>, wherein the ink repellent layer has a critical surface tension γc of from 5 mN/m to 40 mN/m.

<17> The inkjet recording method according to any one of <11> to <16>, wherein the recording medium has a support and a coating layer at least on one face of the support.

<18> The inkjet recording method according to any one of <11> to <17>, wherein the recording medium has a purified water transfer amount of 2 mL/m$^2$ to 45 ml/m$^2$ when measured at 23° C. and 50% RH for a contact time of 100 ms by using a dynamic scanning absorptometer, and has a purified water transfer amount of 3 mL/m$^2$ to 50 mL/m$^2$ when measured at 23° C. and 50% RH for the contact time of 400 ms by using a dynamic scanning absorptometer.

<19> The inkjet recording method according to any one of <17> to <18>, wherein an applied amount of the coating layer is from 0.5 g/m$^2$ to 20.0 g/m$^2$ on a dry basis.

<20> The inkjet recording method according to any one of <11> to <19>, wherein the recording medium has a basis weight of 50 g/m$^2$ to 250 g/m$^2$.

<21> An inkjet recording apparatus containing at least: an ink ejecting unit configured to apply a stimulus to the recording ink as defined in any one of <1> to <10>, and to eject the recording ink so as to record an image on a recording medium.

<22> The inkjet recording apparatus according to <21>, wherein the stimulus is at least one selected from the group consisting of heat, pressure, vibration and light.

BEST MODE FOR CARRYING OUT THE INVENTION

Figure 1:
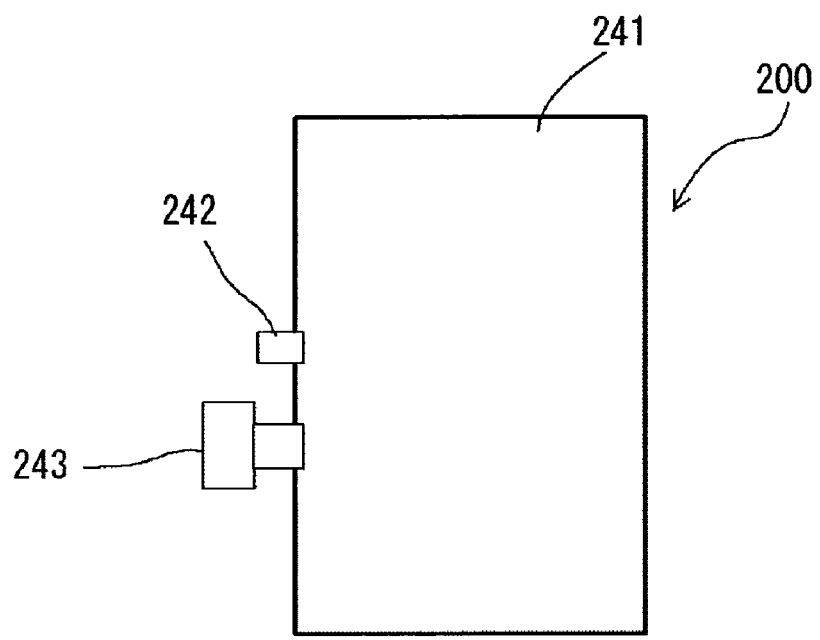
FIG. 1 is a schematic view for illustrating one example of an ink cartridge used in the present invention.

The recording ink of the present invention contains at least water, a water-soluble organic solvent, a surfactant and carbon black having a hydrophilic group on the surface, and also contains other components, if necessary.

The concentration of humic acid released in an aqueous dispersion containing 20% by mass of carbon black recovered from the recording ink is from 5.0 to 20.0 in terms of a maximum absorbance measured at a wavelength of 230 nm to 260 nm.

The humic acid is an organic acid generated on oxidation treatment of carbon black, having an aromatic ring and a plurality of functional groups such as a carboxyl group and a hydroxyl group. Although the constitution thereof is not identified, it has been known that the humic acid exhibits a maximum absorbance at a wavelength of 230 nm to 260 nm. It is, therefore, possible to determine the concentration of humic acid by measuring the absorbance.

The humic acid is generated in a process of oxidization of carbon black, and is removed by washing as much as possible during dispersion preparation. However, when a highly oxidized and bulky carbon black is used, it will not be completely removed by washing, and humic acid is likely to remain in the carbon black.

In a stored ink, residual humic acid is released to reduce the ink's pH. The reduction of pH may cause aggregation and thickening of ink, as well as corrosion of members used in the ink flow paths inside a printer. When printed with such an ink, the ink may not be normally discharged.

On the other hand, when humic acid is remained in the carbon black, evaporation of water causes a reduction in the ink's pH, producing a high image density due to aggregation and thickening of ink. Therefore, the humic acid preferably remains at a certain concentration.

The first step of a method for quantification of humic acid released in an aqueous dispersion containing 20% by mass of carbon black recovered from the recording ink involves separation of such additives as a surfactant, rust-preventive agent and ultraviolet absorbing agent by column chromatography or the like for recovery of a carbon black. The thus obtained carbon black is then subjected to vacuum drying by using a dryer at 50° C. for sufficient evaporation of water and solvent, and is diluted with water to a concentration of 20% by mass.

Fifty grams of the diluted solution is measured into in a beaker, and passed through an ultra-filter (Pellicon Biomax 50 manufactured by Millipore) for 30 minutes to obtain a brown liquid. This liquid is diluted 10 times with ion exchanged water and read on a spectrophotometer (U-3310 manufactured by Hitachi High-Technologies Corporation) equipped with a quartz cell (light path length, 10 mm) at a wavelength of 230 nm to 260 nm. The thus obtained maximum absorbance was increased 10 times to determine the concentration of humic acid.

The thus determined concentration of humic acid is preferably in a range of 5.0 to 20.0 in terms of maximum absorbance measured at a wavelength of 230 nm to 260 nm, and more preferably from 10.0 to 15.0. Where the maximum absorbance is less than 5.0, there may be found a poor image density on a recording medium such as a plain paper or a coated paper. In contrast, where the maximum absorbance is more than 20.0, there is found a tendency that pH is decreased to a greater extent with the lapse of time and aggregation or increase in viscosity takes place after a prolonged storage. There is also found a tendency that the ink is increased in viscosity to a greater extent on water evaporation, which may affect the discharge stability of the ink. In other words, it has been found that when a certain quantity of humic acid is present in the ink, a recorded image high in concentration can be obtained.

This may be due to a fact that solids are quickly increased in viscosity and undergo aggregation on evaporation of water on the surface of the recording medium.

A better understanding can be obtained for the relationship between viscosity increasing behaviors on water evaporation and image density. In other words, if such a condition is satisfied that when a quantity of water evaporation relative to a whole mass of ink is in a range of 34% by mass to 41% by mass, the viscosity is increased from 5.0 times or more to less than 550 times with respect to an initial viscosity, the ink is provided with an excellent discharge stability to increase the image density of a record.

Regarding a relationship between the concentration of humic acid in ink and ink viscosity increasing behaviors on water evaporation, there is found a tendency that the higher the concentration of humic acid is, that is, the higher the value of absorbance determined by the above-described method is, to the higher extent the viscosity associated with water evaporation is elevated, and the lower the concentration of humic acid is, that is, the lower the value of absorbance is, to the lower extent the viscosity associated with water evaporation is elevated.

Further, a quantity of the alkali metal contained in the ink will also affect ink viscosity increasing behaviors on water evaporation. The alkali metal contained in ink includes mainly lithium, sodium and potassium, which are mainly those added as a neutralizer of a hydrophilic group on the surface of carbon black and a neutralizer of a resin emulsion, although some of the alkali metals are derived from a surfactant or other additives.

The quantity of the alkali metal contained in the ink is preferably from 100 ppm to 1500 ppm and more preferably from 200 ppm to 1200 ppm. Where the quantity of the alkali metal is less than 100 ppm, the image density tends to decrease, and where the quantity is more than 1500 ppm, ink may be deteriorated in storage and discharge performance.

-Carbon Black-

Carbon black having a hydrophilic group used in the recording ink of the present invention is that manufactured by using known carbon black, including that manufactured, for example, by a channel method, an oil furnace method, a furnace method, an acetylene black method, a thermal black method or the like. It is noted that carbon black made by the channel method is available only in the limited variations due to a reduced manufacturing quantity in recent years, and carbon black made by the furnace method is now widely used due to availability of wider variations.

There is no particular restriction on the types of carbon black, and general types of carbon black manufactured by any of the above-described methods are usable. Preferable are those in which the primary particle size is from 10 nm to 40 nm, and the specific surface area determined by BET method is from 50 m$^2$/g to 300 m$^2$/g.

The carbon black preferably has a DBP oil absorption from 50 mL/100 g to 300 mL/100 g, and more preferably 100 mL/100 g to 300 mL/100 g. The DBP oil absorption can be obtained from an amount of DBP that is needed to fill voids of 100 g of carbon black by applying droplets of DBP dibutyl phthalate to the carbon black for penetration into the voids.

There is no particular restriction on the carbon black, and any appropriate carbon black may be appropriately selected, including, for example, #2700, #2650, #2600, #2450B, #2400B, #2350, #230, #1000, #990, #980, #970, #960, #950, #900, #850, #750B, MCF 88, #650B, MA 600, MA 77, MA 7, MA 8, MA 11, MA 100, MA 100R, MA 100S, MA 220, MA 230, MA 200RB, MA 14, #52, #50, #47, #45, #45L, #44, #40, #33, #32, #30, #25, #20, #10, #5, #95, #85, CF 9, and #260 (all of which are manufactured by Mitsubishi Chemical Corporation); Raven 700, 5750, 5250, 5000, 3500 and 1255 (all of which are manufactured by Colombia Corporation; Rega 1400R, 330R, 660R, MogulL, Monarch 700, 800, 880, 900, 1000, 1100, 1300, and 1400 (all of which are manufactured by Cabot Corporation); Color Black FW1, FW2, FW2V, FW18, FW200, S150, S160, S170, Printex 35, U, V, 140U, 140V, Special Black 6, 5, 4A and 4 (all of which are manufactured by Degussa AG); Toka Black #8500, #8300, #7550, #7400, #7360, #7350, #7270 and #7100 (all of which are manufactured by Tokai Carbon Co., Ltd.); Fat-soluble (Shiyou) Black N110, N220, N234, N339, N330, N326, N330T, MAF and N550, (all of which are manufactured by Cabot Japan K.K.).

The carbon black can be stably dispersed without using any dispersing agent by modifying the surface, and at least one type of hydrophilic group is bonded on the surface of the carbon black directly or through another atomic group.

There is no particular restriction on the above-described method for modifying the surface. Any method may be appropriately selected, depending on the intended purpose, including, for example, gas-phase oxidation using an oxidative gas such as ozone or liquid-phase oxidation using a liquid oxidizing agent. The liquid oxidizing agent includes hydrogen peroxide, iodine water, hypochloride, chlorite, nitrate, permanganate, dichromate and persulfate.

The hydrophilic group includes, for example, —COOM, —SO$_3$M, —PO$_3$HM, —PO$_3$M$_2$, —SO$_2$NH$_2$ and —SO 2 NHXCOR (in the formula, M denotes a hydrogen atom, alkali metal, ammonium or organic ammonium, and R denotes an alkyl group of 1 to 12 carbon atoms, a phenyl group which may have a substituent group or a naphthyl group which may have a substituent group.). In particular preferable are those in which —COOM or —SO$_3$M is bonded on the surface.

"M" given in the hydrophilic group includes, for example, lithium, sodium and potassium as an alkali metal. The organic ammonium includes, for example, mono- or tri-methyl ammonium, mono- or tri-ethyl ammonium, and mono- or trimethanol ammonium. In view of obtaining a higher image density, alkali metals such as potassium and sodium are preferably used.

The volume average particle size in a state that the carbon black having the hydrophilic group is dispersed in water is preferably from 60 nm to 200 nm and more preferably from 80 nm to 180 nm. Where the volume average particle size is less than 60 nm, there is a failure in obtaining a sufficient image density. Where it is more than 200 nm, clogging may take place on a nozzle more often, resulting in deterioration of the discharge performance. In this instance, the volume average particle size can be measured by using Microtrac UPA (manufactured by Nikkiso Co., Ltd.).

An amount of the carbon black having the hydrophilic group is preferably from 5% by mass to 15% by mass, and more preferably from 6% by mass to 12% by mass, with respect to the total mass of the ink. Where the content is less than 5% by mass, there may be a failure in obtaining a sufficient image density. Where it is more than 15% by mass, ink may be increased in viscosity to result in deterioration of the discharge stability.

-Water-soluble Organic Solvent-

There is no particular restriction on the water-soluble organic solvent. Any solvent may be used, depending on the intended purpose, including, for example, polyvalent alcohols such as ethylene glycol, diethylene glycol, triethylene glycol, ethylene glycol, propylene glycol, dipropylene glycol, tripropylene glycol, 1,3-propane diol, 1,3-butane diol, 2,3-butane diol, 1,4 butane diol, 3-methyl-1,3-butane diol, 1,5-pentane diol, tetra-ethylene glycol, 1,6-hexane diol, 3-methyl-1,5-pentane diol, 2-methyl-2,4-pentane diol, polyethylene glycol, glycerol, 1,2,6-hexane triol, 1,2,4-butane triol, 1,2,3-butane triol and petriol; polyvalent alcohol alkyl ethers such as ethylene glycol monoethyl ether, ethylene glycol monobutyl ether, diethylene glycol monomethyl-ether, diethylene glycol monoethyl ether, diethylene glycol monobutyl ether, tetra-ethylene glycol monomethyl ether and propylene glycol monoethyl ether; polyvalent alcohol aryl ethers such as ethylene glycol monophenyl ether, and ethylene glycol monobenzyl ether; nitrogen-containing heterocycle compounds such as N-methyl-2-pyrolidone, N-hydroxy ethyl-2-pyrolidone, 2-pyrolidone, 1,3-dimethylimidazolidinone, ε-caprolactam; amides such as formamide, N-methyl formamide, formamide, and N,N-dimethyl formamide; amines such as monoethanol amine, diethanol amine, triethanol amine, monoethyl amine, diethyl amine and triethyl amine; sulfur-containing compounds such as dimethyl sulfoxide, sulfolane and thiodiethanol; propylene carbonate and ethylene carbonate. These substances may be used solely or in combination of two or more of them.

Among the above substances, in view of obtaining the solubility and excellent effects in preventing poor jetting properties on water evaporation, in particular preferable are glycerin, ethylene glycol, diethylene glycol, triethylene glycol, propylene glycol, dipropylene glycol, tripropylene glycol, 1,3-butane diol, 2,3-butane diol, 1,4-butane diol, 3-methyl-1,3-butane diol, 1,5-pentane diol, tetra-ethylene glycol, 1,6-hexane diol, 3-methyl-1,5-pentane diol, 2-methyl-2,4-pentane diol, polyethylene glycol, 1,2,4-butane triol, 1,2,6-hexane triol, thiodiglycol, 2-pyrolidone, N-methyl-2-pyrolidone, and N-hydroxy ethyl-2-pyrolidone.

The amount of the water-soluble organic solvent in the recording ink is preferably from 15% by mass to 40% by mass, and more preferably from 20% by mass to 35% by mass. Where the content is excessively low, a nozzle may be more likely to dry, thus resulting in a poor discharge of ink droplets. Where the content is excessively high, ink viscosity may be increased to exceed an appropriate range of the viscosity.

-Surfactant-

The surfactant may be used solely by selecting any one of those consisting of anionic surfactants, cationic surfactants, nonionic surfactants, amphoteric surfactants and fluorochemical surfactants or in combination of two or more of them. Among these, nonionic surfactants and fluorochemical surfactants are in particular preferable.

The anionic surfactants include, for example, alkylallyl, alkylnaphthalene sulfonate, alkyl phosphate, alkyl sulfate, alkyl sulfonate, alkylether sulfate, alkyl sulfosuccinate, alkylester sulfate, alkylbenzene sulfonate, alkyldiphenyl ether disulfonate, alkylaryl ether phosphate, alkylaryl ether sulfate, alkylaryl etherester sulfate, olefin sulfonate, alkane olefin sulfonate, polyoxyethylene alkylether phosphate, polyoxyethylene alkylether sulfate ester, ether carboxylate, sulfosuccinate, α-sulfo fatty acid ester, fatty acid salt, condensate of fatty acid with amino acid, and naphthenic acid salt.

The nonionic surfactants include, for example, an acetylene glycol-based surfactant, polyoxyethylene alkylether, polyoxyethylene alkylphenyl ether, polyoxyethylene alkyl ester, polyoxyethylene sorbitan fatty acid ester.

The cationic surfactants include, for example, alkyl amine salt, dialkyl amine salt, aliphatic amine salt, benzalkonium salt, quaternary ammonium salt, alkylpyridinium salt, imidazorinium salt, sulfonium salt and phosphonium salt.

The amphoteric surfactants include, for example, imidazoline derivatives such as imidazorinium betaine; dimethylalkyl lauryl betaine, alkylglycine and alkyldi(aminoethyl)glycine.

The fluorochemical surfactants may preferably include a compound expressed by any one of the following general formulae (I) to (III).

$$CF_3CF_2(CF_2CF_2)_m-CH_2CH_2O(CH_2CH_2O)_nH \quad (I)$$

However, in the general formula (I), m denotes an integer of 0 to 10, and n denotes an integer of 1 to 40.

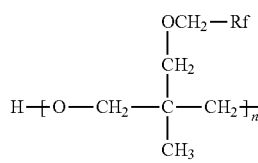

However, in the general formula (II), Rf denotes $CF_3$ or $CF_2CF_3$. Further, n, m and p respectively denote an integer of 1 to 4, that of 6 to 25 and that of 1 to 4.

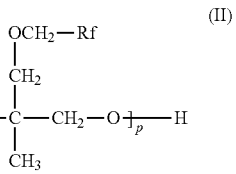

However, in the general formula (III), q denotes an integer of 1 to 6, Rf denotes $CF_3$ or $CF_2CF_3$. $R_1$ denotes $SO_3-$ and $R_2$ denotes $NH_4^+$.

The fluorochemical surfactants may include commercially available products, for example, Surflon S-111, S-112, S-113, S-121, S-131, S-132, S-141 and S-145 (all of which are manufactured by Asahi Glass Co., Ltd.); Fullard FC-93, FC-95, FC-98, FC-129, FC-135, FC-170C, FC-430, FC-431 and FC-4430 (all of which are manufactured by Sumitomo 3M Limited); Megafack F-470, F-1405 and F-474 (all of which are manufactured by Dainippon Ink and Chemicals Incorporated); Zonyl FS-300, FSN, FSN-100 and FSO (all of which are manufactured by Dupont Inc.); F-top EF-351, 352, 801 and 802 (all of which are manufactured by Jemco Inc.).

-Resin Fine Particles-

Resin fine particles are allowed to be added to the recording ink of the present invention. The resin fine particles are those in which a water-insoluble resin is dispersed in water, and on evaporation of a solvent, the resin fine particles are fused to each other to form a film, thereby developing an effect of fixing a coloring agent on a medium. Further, when the solvent is deposited, the resin fine particles tend to increase in viscosity and undergo aggregation, inhibiting the penetration of coloring compositions to provide a high image density. They are also effective in preventing strike through.

Resin compositions in the resin fine particles include, for example, acrylic resin, vinyl acetate resin, styrene-butadiene resin, vinyl chloride resin, acryl-styrene resin, acryl silicone resin, butadiene resin, styrene resin, urethane resin, and acrylurethane resin.

The resin emulsion is preferably contained from 0.1% by mass to 40% by mass with respect to a whole quantity of ink and more preferably from 1% by mass to 25% by mass. Where the resin emulsion is contained in a quantity of less than 0.1% by mass, there may be a failure in obtaining a sufficient fixing property. Where it is contained in excess of 40% by mass, the ink is abundant in solids and scarce in solvents, which may deteriorate the storage stability or result in frequent drying and solidification of the ink at a nozzle to decrease the discharge performance.

The resin fine particles are preferably from 50 nm to 200 nm in volume average particle size and more preferably from 60 nm to 80 nm. Where the volume average particle size is less than 50 nm, the resin emulsion may be increased in viscosity, thereby causing difficulty in providing the ink viscosity which can be discharged by an inkjet printer, and where it is in excess of 200 nm, resin fine particles may be clogged inside the nozzle of the inkjet printer to result in failure of discharge.

The resin fine particles are preferably added to the carbon black from 0.05 parts by mass to 1.2 parts by mass with respect to the carbon black of 1 part by mass, and more preferably from 0.2 parts by mass to 1.0 part by mass. Where the resin fine particles are added in a quantity of less than 0.05 parts by mass, there may be a failure in obtaining a sufficient fixing property. Where they are added in excess of 1.2 parts by mass, the storage stability may be deteriorated or the discharge performance may be decreased.

-Penetrating Agent-

The penetrating agent includes a diol compound having the carbon number of 7 to 11. Where the carbon number is less than 7, there is a failure in obtaining a sufficient penetration, thereby spoiling a recording medium when the medium is printed on both faces, or there is found an insufficient spread of ink on the recording medium to result in a poor filling of pixels, thereby deteriorating the quality of characters or the image density. Where the carbon number is in excess of 11, the storage stability may be decreased.

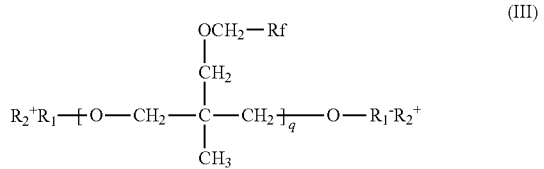

The diol compounds preferably include, for example, 2-ethyl-1,3 hexane diol and 2,2,4-trimethyl-1,3 pentanediol.

The diol compound is preferably added from 0.1% by mass to 20% by mass and more preferably from 0.5% by mass to 10% by mass. Where the compound is added in an excessively small quantity, ink is poorly permeated into paper, which may lead to a case where the paper is rubbed by transfer rollers and blemished, ink attached on a transfer belt on reversing the recording face of a recording medium for printing on both faces thereof may spoil the recording medium, or there may be a failure in providing a high-speed printing or both-face printing. In contrast, where the compound is added in an excessively large quantity, the printing dot diameter is made larger, which may widen the line of characters or decrease the image sharpness.

-pH Buffering Agent-

In order to prevent a pH decrease in the ink during a prolonged storage, in the present invention, usable are conventionally known solutions such as a phosphate buffer solution, acetate buffer solution, ethanol amine buffer solution, boric acid buffer solution, citric acid buffer solution, tartaric acid buffer solution, and Good's buffer solution. Among these buffer solutions, an organic pH buffering agent selected from Good's buffer solution is particular preferable.

The Good's buffer solution is zwitter ion amino acids such as N-substituted taurine and N-substituted glycine, and known as an organic buffering agent suitable for bio-chemical uses.

The Good's buffer solution has specific structures which are as follows:

ACES: Chemical name N-(2-Acetamido)-2-aminoethanesulfonic acid $$H_2NCOCH_2NHCH_2CH_2SO_3H \quad (1)$$

ADA: Chemical name N-(2-Acetamido) iminodiacetic acid $$H_2NCOCH_2N(CH_2COOH)_2 \quad (2)$$

BES: Chemical name N,N-Bis(2-hydroxyethyl)-2-aminoethanesulfonic acid $$(HOCH_2CH_2)_2NCH_2CH_2SO_3H \quad (3)$$

Bicine: Chemical name N,N-Bis(2-hydroxyethyl)glycine $$(HOCH_2CH_2)_2NCH_2COOH \quad (4)$$

Bis-Tris: Chemical name Bis(2-hydroxyethyl) iminotris (hydroxymethyl)methane $$(HOCH_2)_3CN(CH_2CH_2OH)_2 \quad (5)$$

CAPS: Chemical name N-Cyclohexyl-3-aminopropanesulfonic acid

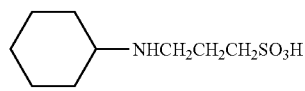

(6)

CAPSO: Chemical name N-Cyclohexyl-2-hydroxy-3-aminopropanesulfonic acid

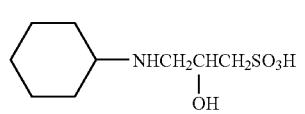

(7)

CHES: Chemical name N-Cyclohexyl-2-aminoethanesulfonic acid

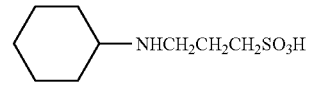

(8)

DIPSO: Chemical name 3-[N,N-Bis(2-hydroxyethyl)amino]-2-hydroxypropanesulfonic acid

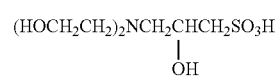

(9)

EPPS: Chemical name 3-[4-(2-Hydroxyethyl)-1-piperazinyl]propanesulfonic acid

(10)

HEPES: Chemical name 2-[4-(2-Hydroxyethyl)-1-piperazinyl]ethanesulfonic acid

(11)

HEPPSO: Chemical name 2-Hydroxy-3-[4-(2-hydroxyethyl)-1-piperazinyl]propanesulfonic acid, monohydrate

(12)

MES: Chemical name 2-Morpholinoethanesulfonic acid, monohydrate

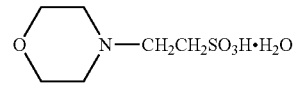

(13)

MOPS: Chemical name 3-Morpholinopropanesulfonic acid

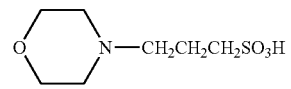

(14)

MOPSO: Chemical name 2-Hydroxy-3-morpholinopropanesulfonic acid

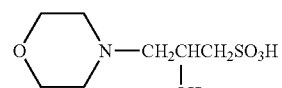

(15)

PIPES: Chemical name piperazine-1,4-bis(2-ethanesulfonic acid)

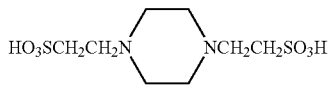
(16)

POPSO: Chemical name piperazine-1,4-bis(2-hydroxy-3-propanesulfonic acid), dihydrate

(17)

TAPS: Chemical name N-Tris(hydroxymethyl)methyl-3-aminopropanesulfonic acid $$(HOCH_2)_3CNHCH_2CH_2CH_2SO_3H \quad (18)$$

TAPSO: Chemical name 2-Hydroxy-N-tris(hydroxymethyl)methyl-3-aminopropanesulfonic acid

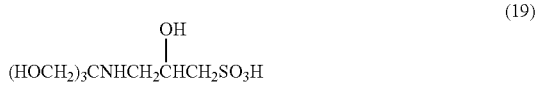
(19)

TES: Chemical name N-Tris(hydroxymethyl)methyl-2-aminoethanesulfonic acid $$(HOCH_2)_3CNHCH_2CH_2SO_3H \quad (20)$$

Tricine Chemical name N-[Tris(hydroxymethyl)methyl]glycine $$(HOCH_2)_3CNHCH_2COOH \quad (21)$$

The pH buffering agent is added to the ink preferably from 0.001% by mass to 5.0% by mass and more preferably from 0.005% by mass to 1.0% by mass.

There is no particular restriction on other compositions. Any composition may be appropriately selected whenever necessary, which includes, for example, pH adjusting agent, anti-septic/anti-mildew agent, rust-preventive agent, anti-oxidizing agent, ultraviolet absorbing agent, oxygen absorbent and light stabilizer.

The anti-septic/anti-mildew agent includes, for example, 1,2-benzoisothiazoline-3-on, sodium dehydroacetate, sodium sorbate, 2-pyridinethiol-1-sodium oxide, sodium benzoate and sodium pentachlorophenol.

There is no particular restriction on the pH adjusting agent, as long as it does not affect ink to be formulated and is able to retain pH at 7 or higher. Any given substance may be used, depending on the intended purpose.

The pH adjusting agent includes, for example, amines such as diethanol amine and triethanol amine; hydroxides of alkali metal elements such as lithium hydroxide, sodium hydroxide and potassium hydroxide; carbonates of alkali metals such as ammonium hydroxide, quaternary ammonium hydroxide, quaternary phosphonium hydroxide, lithium carbonate, sodium carbonate and potassium carbonate.

The rust-preventive agent includes, for example, acid sulfite, sodium thiosulfate, ammonium thiodiglycolate, diisopropyl ammonium nitrite, pentaerithritol tetranitrate and dicyclohexyl ammonium nitrite.

The anti-oxidizing agents include, for example, phenol anti-oxidizing agents (including hindered phenol anti-oxidizing agents), amine anti-oxidizing agents, sulfur anti-oxidizing agents, and phosphorus anti-oxidizing agents.

The phenol anti-oxidizing agents (including hindered phenol anti-oxidizing agents) include, for example, butylated hydroxy anisole, 2,6-di-tert-butyl-4-ethylphenol, stearyl-β-(3,5-di-tert-butyl-4-hydroxyphenyl) propionate, 2,2'-methylenebis (4-methyl-6-tert-butylphenol), 2,2'-methylenebis (4-ethyl-6-tert-butylphenol), 4,4'-butylidenebis (3-methyl-6-tert-butylphenol), 3,9-bis[1,1-dimethyl-2-[β-(3-tert-butyl-4-hydroxy-5-methylphenyl) propyonyloxy]ethyl] 2,4,8,10-tetraixaspiro[5,5]undecane, 1,1,3-tris(2-methyl-4-hydroxy-5-tert-butylphenyl) butane, 1,3,5-trimethyl-2,4,6-tris(3,5-di-tert-butyl-4-hydroxy benzyl)benzene, and tetrakis [methylene-3-(3', 5'-di-tert-butyl-4'-hydroxy phenyl) propionate]methane.

The amine anti-oxidizing agents include, for example, phenyl-β-naphthyl amine, α-naphthyl amine, N,N'-di-sec-butyl-p-phenylene diamine, phenothiazine, N,N'-diphenyl-p-phenylene diamine, 2,6-di-tert-butyl-p-cresol, 2,6-di-tert-butylphenol, 2,4-dimethyl-6-tert-butyl-phenol, butylhydroxy anisole, 2,2'-methylene-bis (4-methyl-6-tert-butylphenol), 4,4'-butylidene-bis (3-methyl-6-tert-butylphenol), 4,4'-thiobis (3-methyl-6-tert-butylphenol), tetrakis [methylene-3 (3,5-di-tert-butyl-4-dihydroxyphenyl)propionate]methane, and 1,1,3-tris(2-methyl-4-hydroxy-5-tert-butylphenyl)butane.

The sulfur anti-oxidizing agents include, for example, dilauryl 3,3'-thiodipropionate, distearyl thiodipropionate, laurylstearyl thiodipropionate, dimyristyl 3,3'-thiodipropionate, distearylβ,β'-thiodipropionate, 2-mercaputo benzoimidazole, and dilauryl sulfide.

The phosphorus anti-oxidizing agents include, for example, triphenyl phosphite, octadecyl phosphite, triisodecyl phosphite, trilauryl trithio phosphite, and trinonyl phenyl phosphite.

The ultraviolet absorbing agents include, for example, benzophenone ultraviolet absorbing agents, benzotriazole ultraviolet absorbing agents, salicylate ultraviolet absorbing agents, cyanoacrylate ultraviolet absorbing agents, and nickel complex salt ultraviolet absorbing agents.

The bezophenone ultraviolet absorbing agents include, for example, 2-hydroxy-4-n-octoxy benzophene, 2-hydroxy-4-n-dodecyl oxybenzophenone, 2,4-dihydroxy benzophenone, 2-hydroxy-4-methoxybenzophenone, and 2,2',4,4'-tetrahydroxybenzophenone.

The benzothiazole ultraviolet absorbing agents include, for example, 2-(2'-hydroxy-5'-tert-octylphenyl)benzotriazole, 2-(2'-hydroxy-5'-methyl phenyl)benzotriazole, 2-(2'-hydroxy-4'-octoxyphenyl)benzotriazole, and 2-(2'-hydroxy-3'-tert-butyl-5'-methyl phenyl)-5-chlorobenzotriazole.

The salicylate ultraviolet absorbing agents include, for example, phenyl salicylate, p-tert-butylphenyl salicylate, and p-octylphenyl salicylate.

The cyanoacrylate ultraviolet absorbing agents include, for example, ethyl-2-cyano-3,3'-diphenyl acrylate, methyl-2-cyano-3-methyl-3-(p-methoxyphenyl)acrylate, and butyl-2-cyano-3-methyl-3-(p-methoxyphenyl)acrylate.

The nickel complex salt ultraviolet absorbing agents include, for example, nickelbis (octylphenyl)sulfide, 2,2'-thiobis (4-tert-octylphalate)-n-butylamine nickel (II), 2,2'-thiobis (4-tert-octyylphalate)-2-ethylhyxyl amine nickel (II), and 2,2'-thiobis (4-tert-octylphalate) triethanol amine nickel (II).

There is no particular restriction on physical properties of the recording ink of the present invention. The physical properties may be appropriately selected, depending on the intended purpose. It is preferable that, for example, the solids content, viscosity, surface tension and pH preferably fall under the following ranges.

The solids content of the recording ink is preferably in a range of 5% by mass to 20% by mass and more preferably from 6% by mass to 15% by mass. Where the solids content is less than 5% by mass, there may be a failure in obtaining a sufficient image density.

In this instance, the solids content of the ink in the present invention substantially means the water-insoluble coloring agent and resin fine particles.

The viscosity is preferably from 6 mPa·a to 20 mPa·s at 25° C., and more preferably from 6.5 mPa·s to 12 mPa·s. Where the viscosity exceeds 20 mPa·s, there may be a difficulty in securing the discharge stability.

The surface tension is preferably in a range of 25 mN/m to 55 mN/m at 20° C. Where the surface tension is less than 25 mN/m, ink may apparently ooze out on a recording medium to result in a failure of obtaining a stable jetting. Where the surface tension exceeds 55 mN/m, the ink will not penetrate into the recording medium sufficiently to result in a prolonged drying time.

The pH is preferably, for example, from 7 to 10.

A prolonged storage of the recording ink may change the physical properties. In particular, when the ink is stored after heating, it undergoes an increase in viscosity and a decrease in pH. It is desirable to keep the change in physical properties to the least possible extent. For example, the increase in viscosity after two-week storage at 60° C. is preferably within 5%, and the decrease in pH is preferably within −5%.

The recording ink of the present invention is favorably used in various fields and effectively used in an image recording apparatus (a printer or the like) based on an inkjet recording system. For example, ink having such a function that paper to be recorded and the recording ink are heated at temperatures of 50° C. to 200° C. during printing or before or after printing to promote printing fixing can be used in a printer or the like. This ink can be in particular preferably used in an ink cartridge, an ink record, an inkjet recording apparatus and an inkjet recording method of the present invention.

<Recording Medium>

The recording ink of the present invention is able to form a high-quality image not only on paper exclusively used for inkjet printing and plain paper but also on coated paper poor in water absorption. In this instance, the coated paper poor in water absorption is printing coated paper in which a coating layer is provided at least on one of two faces of a support and a quantity of purified water transferred to the recording medium measured at the contact time of 100 ms by using a dynamic scanning liquid absorbing system is in a range of 3 $mL/m^2$ to 15 $mL/m^2$.

In the above-described recording medium, a quantity of the recording ink of the present invention transferred to the recording medium at the contact time of 100 ms measured by using a dynamic scanning absorptometer is preferably from 2 $mL/m^2$ to 40 $mL/m^2$, and more preferably from 3 $mL/m^2$ to 30 $mL/m^2$. Further, a quantity of purified water transferred to the recording medium is preferably from 2 $mL/m^2$ to 45 $mL/m^2$ and more preferably from 3 $mL/m^2$ to 30 $mL/m^2$.

Where a quantity of the recording ink and that of the purified water transferred at the contact time of 100 ms are excessively small, beading may take place more frequently. Where they are excessively great, the ink dot diameter after the recording may be made smaller than desired.

A quantity of the recording ink of the present invention transferred to the recording medium at the contact time of 400 ms measured by using a dynamic scanning absorptometer is from 3 $mL/m^2$ to 50 $mL/m^2$, and preferably from 4 $mL/m^2$ to 40 $mL/m^2$.

Further, a quantity of purified water transferred to the recording medium is preferably from 3 $mL/m^2$ to 50 $mL/m^2$ and more preferably from 4 $mL/m^2$ to 40 $mL/m^2$.

Where the quantity transferred at the contact time of 400 ms is excessively small, ink is not sufficiently dried and spur marks may develop easily. In contrast, where the quantity is excessively great, bleeds may take place easily and the gloss of an image portion after drying may be decreased.

In this instance, the dynamic scanning absorptometer (DSA, Journal of the Japan Technical Association of the Pulp and Paper Industry, Vol. 48, May 1994, page 88-92, authored by Mr. Shigenori Kuga is a device capable of exactly measuring an absorbed quantity in an extremely short time. The dynamic scanning absorptometer is able to read a speed of liquid absorption directly from the movement of the meniscus in a capillary tube. A sample is formed into a disk shape, on which an absorption head is scanned helically. An automatic measurement is realized by a method in which the scanning speed is allowed to change according to previously established patterns and one sheet of the sample is used to make measurements only by the number of points required. A liquid supply head to paper samples is connected to the capillary tube via a Teflon (registered trade mark)-made tube, and the position of the meniscus in the capillary tube is automatically read by an optical sensor. More specifically, the dynamic scanning absorptometer (K350 series D type, manufactured by Kyowa Seiko Co., Ltd.) is used to measure a quantity of purified water or ink transferred. Quantities transferred at the contact time of 100 ms and at the contact time of 400 ms can be determined by interpolating measurements of the quantities transferred at adjacent contact times of the respective contact times. The measurements are made at 23° C. and RH of 50%.

-Support-

There is no particular restriction on the support. Any substance may be selected depending on the intended purpose, including, for example, paper mainly based on wood fibers or sheet-like substances such as non-woven fabrics mainly based on wood fibers and synthetic fibers.

There is no particular restriction on the paper. Any known paper may be appropriately used depending on the intended purpose, including, for example, wood pulp and waste paper pulp. The wood pulp includes, for example, broad-leaved wood bleached kraft pulp (LBKP) and coniferous wood bleached kraft pulp (NBKP), NBSP, LBSP, GP, and TMP.

Materials of the waste paper pulp include high-quality white paper, clean envelops, cream-white paper, cards, special white paper, wood containing white paper, simili paper, white-color paper, Kent paper, white art paper, special high-quality paper cuttings, high-quality paper cuttings, newspapers ad magazines as listed in the table of waste paper standard specifications issued by the Paper Recycling Promotion Center. More specifically, the materials include waste paper and waste paperboard, for example, printer paper used in information-related fields such as non-coated computer paper, thermal recording paper and pressure sensitive paper; office waste paper such as PPC paper; coated paper such as art paper, coat paper, finely coated paper and matt paper; non-coated paper such as wood-free paper, colored wood-free paper, notebook paper, letter paper, package paper, decorative paper, wood containing paper, paper for gazettes, woody paper, package paper used in supermarkets and the like, simili paper, machine glazed paper and milk carton paper; chemical pulp-containing paper and high-yield pulp containing paper. These materials may be used solely or in combination of two or more of them.

The waste paper pulp is in general manufactured by a combination of the following four steps.

(1) Pulping is a step in which a pulper is used to treat waste paper mechanically and chemically, disintegrating the paper to give a fiber form, thereby removing printing ink from fibers.

(2) Dust removal is a step in which foreign matter (plastics and others) and waste contained in waste paper are removed by screening, cleaning and others.

(3) Ink removal is a step in which printing ink removed from fibers by using a surfactant is removed from a system by using a floating method or a washing method.

(4) Bleaching is a step in which oxidation or reduction is used to improve the whiteness of fibers.

A mixing ratio of waste paper pulp to a whole pulp content on mixture of the waste pulp is preferably 40% or less, with consideration given to measures against a possible curling of paper after recording.

Internal additives used in the support include, for example, conventionally known pigments as white pigments. The white pigments include, for example, white inorganic pigments such as light calcium carbonate, heavy calcium carbonate, kaolin, clay, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminum hydroxide, alumina, lithopone, zeolite, magnesium carbonate, and magnesium hydroxide; organic pigments such as styrene-based plastic pigment, acrylic plastic pigment, polyethylene, microcapsule, urine resin, and melamine resin. The pigments may be used solely or in combination of two or more of them.

Internal sizing agents used in making the support include, for example, a neutral rosin sizing agent used in making neutralized paper, alkenyl succinic anhydride (ASA), alkylketene dimer (AKD), and a petroleum resin-based sizing agent. Of these agents, the neutral rosin sizing agent and alkenyl succinic anhydride are in particular preferable. The alkylketen dimer can be used in a smaller quantity because of its higher sizing effect. However, there is a case where the friction coefficient on the surface of recording paper (medium) is decreased to result in an easy slippage, the use of which is not favorable in terms of transferring the paper on inkjet recording.

-Coating Layer-

The coating layer contains a pigment and a binder (binding agent), and also contains a surfactant and other compositions, if necessary.

Usable as the pigment is an inorganic pigment or a combination of an inorganic pigment with an organic pigment.

The inorganic pigment includes, for example, kaoline, talc, heavy calcium carbonate, light calcium carbonate, calcium sulfite, amorphous silica, titanium white, magnesium carbonate, titanium dioxide, aluminum hydroxide, calcium hydroxide, magnesium hydroxide, zinc hydroxide, and chlorite. Of these pigments, kaoline is in particular preferable because it is excellent in gloss development property and able to provide a texture close to that of paper for offset printing.

The kaoline includes delaminated kaoline, calcinated kaoline and engineered kaoline by surface modification. When the gloss development property is taken into account, it is preferable that kaoline having such a particle size distribution that the particle size of 2 μm or less is 80% by mass accounts for 50% by mass or more with respect to a total quantity of kaoline.

The kaoline is preferably added at 50 parts by mass or more with respect to 100 parts by mass of a total quantity of pigments on the coating layer. Where the addition is less than 50 parts by mass, there may be a failure in obtaining a sufficient gloss. There is no particular restriction on the added quantity. The kaoline is more preferably added at 90 parts by mass or less in terms of coating suitability, with consideration given to the fluidity of kaoline and increase in viscosity under a high sheering force in particular.

The organic pigment includes a water-soluble dispersion, for example, styrene acryl copolymer particles, styrene-butadiene copolymer particles, polystyrene particles, and polyethylene particles. Two or more of the pigments may be mixed.

The organic pigment is added preferably from 2 parts by mass to 20 parts by mass with respect to 100 parts by mass of a total quantity of pigments on the coating layer. Since the organic pigment is excellent in gloss development property and smaller in specific gravity than an inorganic pigment, it is able to provide a coating layer high in bulk, great in gloss and favorable in surface covering property. Where it is added at less than 2 parts by mass, the above-described effects are not obtained. Where it is added at a quantity exceeding 20 parts by mass, there is found deterioration in the fluidity of a coating solution to result in a decreased coating operation, which is not desirable in terms of cost.

The organic pigment is available in a solid type, a hollow type, a donut type and other. When the gloss development property, surface covering property and fluidity of a coating solution are comprehensively considered, the hollow type having an average particle size of 0.2 μm to 3.0 μm is preferably employed, and that having a void percentage of 40% or higher is more preferably employed.

An aqueous resin is preferably used as the binder.

At least one of a water-soluble resin and an aqueous dispersible resin may be favorably used as the aqueous resin. There is no particular restriction on the water-soluble resin, and any resin may be appropriately selected, depending on the intended purpose. The resins include, for example, a modified product of polyvinyl alcohols such as polyvinyl alcohol, anion modified polyvinyl alcohol, cation modified polyvinyl alcohol and acetal modified polyvinyl alcohol; polyurethane; a modified product of polyvinyl pyrolidone such as a copolymer of polyvinyl pyrolidone and polyvinyl pyrolidone with vinyl acetate, a copolymer of vinyl pyrolidone and dimethyl aminoethyl/methacrylate, a copolymer of quaternary vinyl pyrolidone with dimethyl aminoethyl/methcrylate, and a copolymer of vinyl pyrolidone with methacrylamide propyl tri methyl ammonium chloride; cellulose such as carboxymethyl cellulose, hydroxyethyl cellulose and hydroxypropyl cellulose; a modified product of cellulose such as cationic hydroxyethyl cellulose; a synthetic resin such as polyester, polyacryl acid(ester), melamine resin, and their modified products, and a copolymer of polyester with polyurethane; poly(meta)acrylic acid, poly(meta)acrylamide, acidified starch, phosphorylated starch, internally modified starch, cationic starch, various types of modified starch, polyethylene oxide, polyacrylic acid soda, and alginate soda. These resins may be used solely or in combination of two or more of them.

Of these resins, in view of ink absorption, in particular preferable are polyvinyl alcohol, cation modified polyvinyl alcohol, acetal modified polyvinyl alcohol, polyester, polyurethane, and a copolymer of polyester with polyurethane.

There is no particular restriction on the aqueous dispersible resin. Any resin may be appropriately selected, depending on the intended purpose, including, for example, poly vinyl acetate, ethylene/vinyl acetate copolymer, polystyrene, styrene/(meta) acryl ester copolymer, (meta)acryl ester polymer, vinyl acetate(meta)acrylic acid(ester) copolymer, styrene/butadiene copolymer, ethylene/propylene copolymer, polyvinyl ether, and silicone/acryl copolymer. These resins may contain a cross-linking agent such as methylolated melamine, methylolated urea, methylolated hydroxy propylene urea, and isocyanate and also have a copolymer containing a unit of N-methylol acrylamide with a self cross-linking property. These aqueous resins may be used in a plurality.

The aqueous resin is added preferably from 2 parts by mass to 100 parts by mass with respect to 100 parts by mass of the pigments, and more preferably from 3 parts by mass to 50 parts by mass. The aqueous resin is added in such a quantity that the recording medium can obtain a desired absorption property.

Where an aqueous dispersible coloring agent is used as the coloring agent, it is not always necessary to formulate a cationic organic compound. There is no particular restriction on the coloring agent. Any agent may be appropriately selected depending on the intended purpose, including, for example, a primary to a tertiary amine which reacts with a sulfonic acid group, a carboxyl group, an amino group or others in a direct dye or an acid dye in water-soluble ink to form an insoluble salt, monomer, oligomer and polymer of quaternary ammonium salt. Of these substances, the oligomer or the polymer is preferable.

The cationic organic compound includes, for example, dimethyl amine/epichloruhydrine polycondensate, dimethyl amine/ammonia/epichloruhydrine condensate, poly (trimethyl aminoethyl methcrylate/methyl sulfate), diallyl amine hydrochloride/acrylamide copolymer, poly (diaryl amine hydrochloride/sulfur dioxide), polyaryl amine hydrochloride, poly (aryl amine hydrochloride/diaryl amine hydrochloride), acrylamide/diaryl amine copolymer, polyvinyl amine copolymer, dicyandiamide, dicyandiamide/ammonium chloride/urea/formaldehyde condensate, polyalkylene polyamine/dicyandiamide ammonium salt condensate, dimethyldiallyl ammonium chloride, polydiallyl methyl amine hydrocloride, poly (diallyldimethyl ammonium chloride), poly (diallyldimethyl ammonium chloride/sulfur dioxide), poly (diallyldimethyl ammonium chloride/diallyl amine hydrochloride derivative), acrylamide/diallyldimethyl ammonium chloride copolymer, acrylate/acrylamide/diallyl amine hydrochloride copolymer, ethylene imine derivatives such as polyethylene imine and acryl amine polymer, and polyethylene imine alkylene oxide modified products. These substances may be used solely or in combination of two or more of them.

Of these substances, it is preferable to use in combination of a low-molecular-weight a cationic organic compound such as dimethyl amine/epichloruhydrine polycondensate or polyallyl amine hydrochloride with another relatively-high-molecular-weight cationic organic compound such as poly (diallydimethyl ammonium chloride). The combined use makes it possible to improve the image density and reduce feathering to a greater extent as compared with sole use.

The cationic organic compound is treated by a colloid titration method (in which polyvinyl potassium sulfate and truidine blue are used) to determine a cationic equivalent, which is preferably in a range of 3 meq/g to 8 meq/g. Where the cationic equivalent falls in this range, favorable results are obtained in the above-described range of the drying attachment quantity.

In this instance, in determining the cationic equivalent by the colloid titration method, the cationic organic compound is diluted with distilled water so as to give 0.1% by mass on a dry solid basis, without adjustment of pH.

The cationic organic compound is preferably from 0.3 $g/m^2$ to 2.0 $g/m^2$ in drying attachment quantity. Where the cationic organic compound is less than 0.3 $g/m^2$ in drying attachment quantity, there may be a failure in sufficiently improving the image density or effectively decreasing feathering.

There is no particular restriction on the surfactant, and any surfactant may be appropriately selected depending on the intended purpose, including, for example, an anionic active agent, a cationic active agent, an amphoteric active agent and a non-ionic active agent. Of these agents, the non-ionic active agent is in particular preferable. The surfactant is added, by which the water resistance of an image can be improved and the image density is also increased, thus resulting in the improvement of bleeding.

The non-ionic active agent includes, for example, a higher alcohol ethylene oxide addition, an alkyl phenol ethylene oxide addition, a fatty acid ethylene oxide addition, a polyvalent alcohol fatty acid ester ethylene oxide addition, a higher aliphatic amine ethylene oxide addition, a fatty acid amide ethylene oxide addition, an ethylene oxide addition of fat, a poly propylene glycolethylene oxide addition, a fatty acid ester of glycerol, a fatty acid ester of pentaerithritol, a fatty acid ester of sorbitol or sorbitan, a fatty acid ester of sucrose, an alkylether of polyvalent alcohol and fatty acid amides of alkanol amines. These substances may be used solely or in combination of two or more of them.

There is no particular restriction on the polyvalent alcohol. Any substance may be appropriately selected depending on the intended purpose, including, for example, glycerol, trimethykik propane, pentaerithritol, sorbitol and sucrose. Further, an effectively usable ethylene oxide addition is that in which ethylene oxide is partially substituted with alkylene oxide such as propylene oxide or butylene oxide to an extent of retaining the water solubility. It is preferably substituted at 50% or less. HLB (hydrophile-lipophile balance) of the non-ionic active agent is preferably from 4 to 15 and more preferably from 7 to 13.

The surfactant is added preferably from 0 parts by mass to 10 parts by mass with respect to 100 parts by mass of the cationic organic compound, and more preferably from 0.1 parts by mass to 1.0 part by mass.

Other compositions may be added to the coating layer, whenever necessary, to such an extent that will not affect the object or effect of the present invention. These other compositions include additives such as alumina powder, a pH adjusting agent, an anti-sceptic agent and an anti-oxidizing agent.

There is no particular restriction on a method for forming the coating layer, and any appropriate method may be appropriately selected depending on the intended purpose. The coating layer can be formed by a method in which a layer-coating solution is impregnated or coated on the support. There is no particular restriction on a method for impregnating or coating the layer-coating solution, and any method may be appropriately selected depending on the intended purpose. The coating can be performed by using various types of coaters such as a conventional size press, a gate roll size press, a film transfer size press, a blade coater, a rod coater, an air knife coater, and a curtain coater. In particular, preferable in terms of cost is a method in which the conventional size press, the gate roll size press or the film transfer size press mounted on a paper machine is used to impregnate or attach the coating solution, thereby giving an on-machine finishing.

There is no particular restriction on an applied amount of a coating solution for the coating layer. The applied amount may be appropriately selected depending on the intended purpose, preferably from 0.5 g/m$^2$ to 20 g/m$^2$, and more preferably from 1 g/m$^2$ to 15 g/m$^2$ on a dry basis. Where the applied amount is less than 0.5 g/m$^2$, the ink which is not sufficiently absorbed may ooze out to blur characters. Where the applied amount is more than 20 g/m$^2$, the texture is spoiled for paper to result in a fact that the paper is difficult to fold and additional writing with a writing instrument is not easy.

The coated film may be dried, whenever necessary, after the impregnation or coating. There is no particular restriction on temperatures at which the drying is effected in this instance. The temperatures may be appropriately selected depending on the intended purpose and preferably from 100° C. to 250° C.

The recording medium may be also provided with a back layer on the back face of a support and another layer between the support and the coating layer or between the support and the back layer. Further, a protective layer may be provided on the coating layer. These layers may be provided in a single layer or plural layers.

The recording medium may include commercially-available offset printing coat paper and gravure printing coat paper, in addition to inkjet recording media, if their absorption property falls under the above-described range.

The recording medium preferably has basis weight of 50 g/m$^2$ to 250 g/m$^2$, more preferably of from 60 g/m$^2$ to 200 g/m$^2$. Where the basis weight is less than 50 g/m$^2$, defective transfer such as a jammed recording medium may take place more often in the course of transferring the recording medium due to lack of consistency. In contrast, where the basis weight exceeds 250 g/m$^2$, there may also cause defective transfer in which the consistency becomes excessively great, thereby the recording medium is not successfully bent at a curved portion in the transfer course to result in jamming of a recording medium.

(Ink Cartridge)

An ink cartridge of the present invention is to accommodate the recording ink of the present invention in a container and also provided with other members and others appropriately selected, whenever necessary.

There is no particular restriction on the container, which may be appropriately selected for shape, dimensions, structure, material or the like, depending on the intended purpose. The container may be, for example, that having an ink bag formed with an aluminum-laminated film, a resin film or the like.

Next, an explanation will be made for the ink cartridge by referring to FIG. 1 and FIG. 2. In this instance, FIG. 1 is a view for illustrating one example of the ink cartridge of the present invention, and FIG. 2 is a view which also includes a case (outer covering) of the ink cartridge given in FIG. 1.

Figure 2:
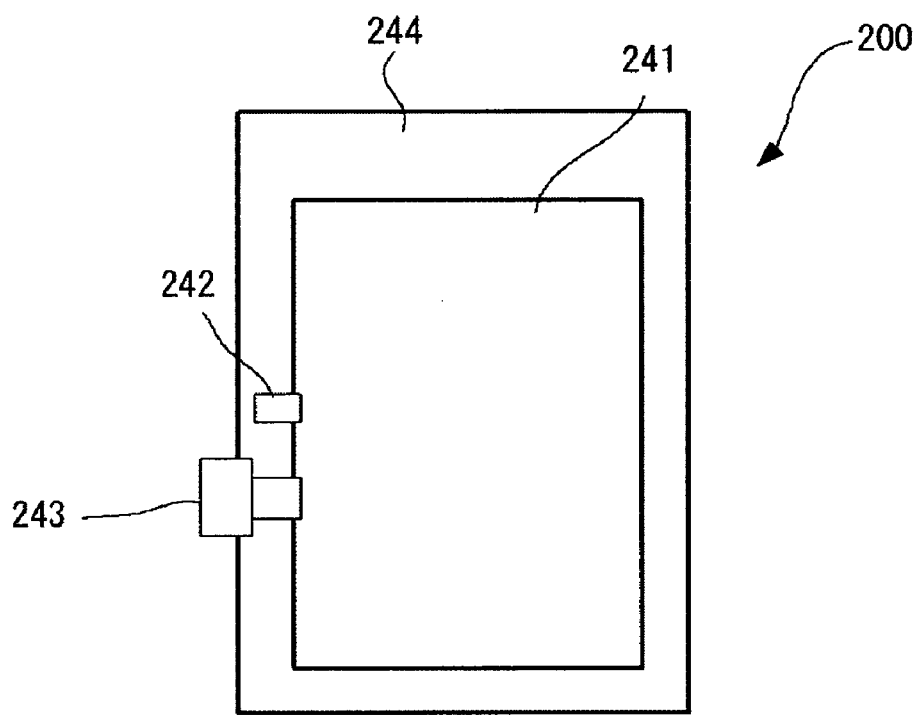
FIG. 2 is a schematic view which also includes a case (outer covering) of the ink cartridge given in FIG. 1.

As illustrated in FIG. 1, the ink cartridge 200 is loaded into an ink bag 241 from an ink filling port 242 and the ink filling port 242 is closed by fusion after air is discharged. When the ink cartridge is used, an ink discharge port 243 made with a rubber member is punctured with a needle on the apparatus main body to supply ink to the apparatus.

The ink bag 241 is formed with a package member such as an aluminum-laminated film devoid of air permeability. As illustrated in FIG. 2, the ink bag 241 is usually housed into a plastic-made cartridge case 244 and used so as to be removably attached to various types of inkjet recording apparatus.

The ink cartridge of the present invention is able to accommodate the recording ink of the present invention and usable so as to be removably attached to various types of inkjet recording apparatuses. Further, the ink cartridge is in particular preferably used so as to be removably attached to an inkjet recording apparatus of the present invention, which will be described later.

(Inkjet Recording Apparatus and Inkjet Recording Method)

An inkjet recording apparatus of the present invention is provided with at least a unit configured to shoot ink and also provided with other units which can be selected whenever necessary, for example, a unit to generate stimulation and a unit to gain control.

An inkjet recording method of the present invention includes at least an ink shooting step and also includes other steps which can be selected whenever necessary, for example, steps of generating stimulation and gaining control.

The inkjet recording method of the present invention can be employed by the inkjet recording apparatus of the present invention, and the ink shooting step can be favorably carried out by using the unit configured to shoot ink. The above-described other steps are also favorably carried out by using the above-described other units.

-Ink Shooting Step and Unit Configured to Shoot Ink-

The ink shooting step is a step of applying stimulation to the recording ink of the present invention, thereby shooting the recording ink from a recording head to record an image on a recording medium.

The unit configured to shoot ink is a means to apply stimulation to the recording ink of the present invention, thereby shooting the recording ink from the head to record an image on a recording medium.

There is no particular restriction on the unit configured to shoot ink, including, for example, various types of ink discharging nozzles.

In the present invention, it is preferable that the liquid chamber portion, the fluid resistance portion, the diaphragm and the nozzle member of the inkjet head are at least partially formed with a material at least containing one of silicon and nickel.

Further, the inkjet nozzle is preferably 30 μm or less in nozzle diameter and more preferably from 1 μm to 20 μm.

Such a constitution is also preferable that a sub-tank for supplying ink is provided on the inkjet head and the ink is supplied to the sub-tank via a supply tube from the ink cartridge.

The stimulation can be generated, for example, by the unit to generate stimulation. There is no particular restriction on such stimulation. Any stimulation may be appropriately selected depending on the intended purpose, including, for example, heat (temperature), pressure, vibration, light and the like. They may be used solely or in combination of two or more of them. Among other things, heat and pressure are preferably used.

It is noted that the unit to generate stimulation includes, for example, a heating device, a pressure device, a piezoelectric element, a vibration generating device, an ultrasonic generator and a lighting device. More specifically, included are, for example, a piezo-electric actuator such as a piezoelectric element, a thermal actuator which uses an electrothermal converter such as a heat element to utilize the change in phase resulting from the film boiling of a liquid, a shape memory alloy actuator which uses the change in metal phase resulting from the change in temperature, and an electrostatic actuator which uses an electrostatic force.

There is no particular restriction on an aspect of shooting the recording ink, which is different depending on the types of stimulation. Where the stimulation is, for example, "heat," such a method is available that thermal energy corresponding to a recording signal is applied to the recording ink inside a recording head, for example, by using a thermal head or the like, bubbles are generated in the recording ink by the thermal energy, thereby a pressure coming from these bubbles is utilized to discharge and jet the recording ink as ink droplets from the nozzle port of the recording head. Further, where the stimulation is "pressure," such a method is available that, for example, voltage is applied to a piezoelectric element attached to a position which is called a pressure chamber inside an ink flow path on a recording head, by which the piezoelectric element is bent to reduce the volume of the pressure chamber, thus discharging and jetting the recording ink as ink droplets from the nozzle port of the recording head.

The to-be-shot ink droplets of the recording ink are preferably, for example, from 3 pL to 40 pL in size and, the discharging/jetting speed is preferably from 5 m/s to 20 m/s, the driving frequency is preferably at 1 kHz or more, and a resolution is preferably at 300 dpi or more.

It is preferable to provide a unit configured to reverse the recording face of a recording medium so as to print on both faces thereof. The reversing unit includes, a transfer belt having an electrostatic force, a unit configured to retain the recording medium by pneumatic absorption and a combination of transfer rollers with spurs.

It is preferable to provide an endless transfer belt and a unit configured to transfer a recording medium while retaining the recording medium, with the surface of the transfer belt being electrified. In this instance, it is particularly preferable to give AC bias of ±1.2 kV to ±2.6 kV to an electrification roller, thereby electrifying the transfer belt.

It is noted that there is no particular restriction on the unit configured to gain control, as long as it does not restrict the movement of each of the above-described units. Any unit may be appropriately selected depending on the intended purpose, including, for example, devices such as a sequencer, a computer and the like.

Where ink with a relatively low surface tension is used such as the recording ink used in the inkjet recording method of the present invention, it is preferable that a nozzle plate is excellent in water repellency and ink repellency. This is because the nozzle plate excellent in water repellency and ink repellency is used, by which even ink low in surface tension can be used to form the meniscus of ink, resulting in a favorable formation of ink droplets (granulation). The meniscus is formed normally, thus there is no chance that ink is pulled toward one direction on jetting of the ink. As a result, such images are obtained that jetting of ink and high in dot position accuracy.

Where printing is made on a medium low in absorption, for example, a recording medium (sheet) used in the inkjet recording method of the present invention, whether the position accuracy is high is remarkably influences the image quality. In other words, ink is less likely to spread on an absorption-low medium, there is developed a void, or a portion at which ink fails in filling the recording medium if the position accuracy is decreased even to a slight extent. This portion at which ink fails in filling the medium will eventually cause variance in image density or decrease in image density to deteriorate the image quality.

However, the inkjet head used in the present invention is able to realize a high dot position accuracy even if ink low in surface tension is used, by which the ink successfully fills a recording medium which is low in absorption, thus making it possible to provide printed matter with a high image quality free of variance in image density or decrease in image density.

Figure 3:
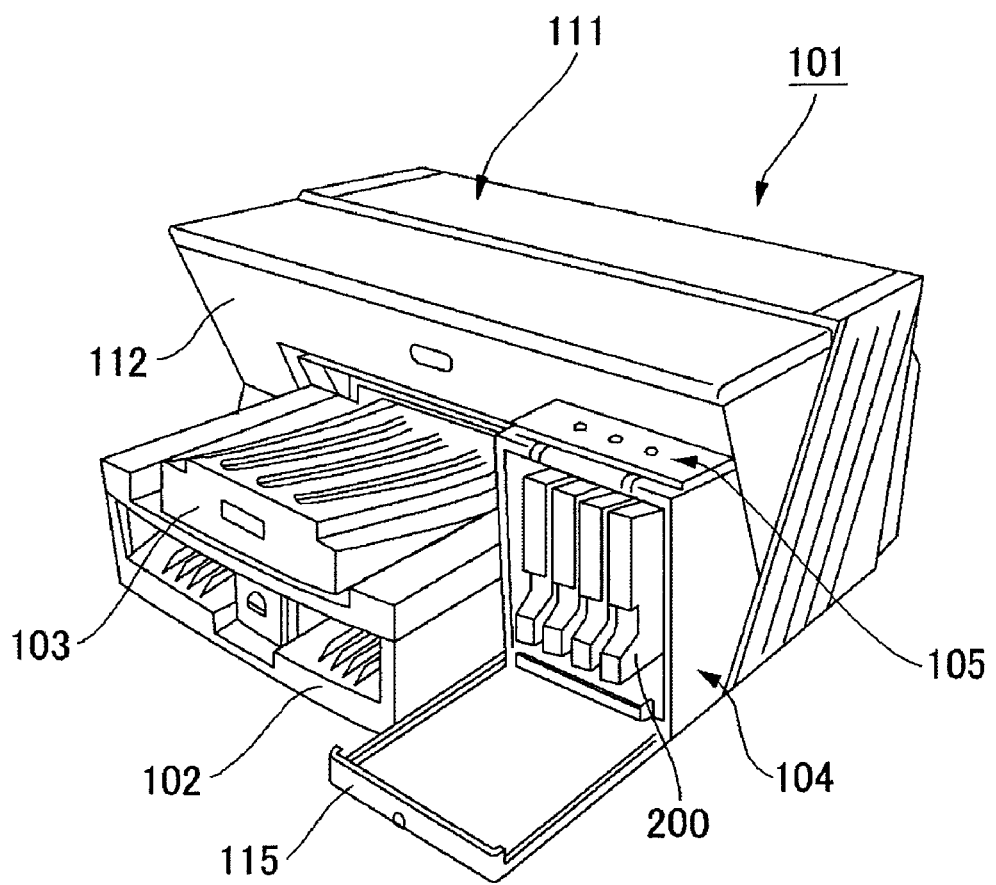
FIG. 3 is a perspective view for explaining a state that the cover of an ink cartridge loading portion is opened in an inkjet recording apparatus of the present invention.

An explanation will be made for one aspect at which an inkjet recording method of the present invention is performed by using an inkjet recording apparatus of the present invention with reference to the drawings. The inkjet recording apparatus shown in FIG. 3 is provided with an apparatus main body 101, a paper feeding tray 102 for feeding sheets loaded on the apparatus main body 101, a paper discharging tray 103 for storing an image-recorded (formed) sheet loaded on the apparatus main body and an ink cartridge loading portion 104. An operation portion 105 including an operation key and a display is arranged on the upper face of the ink cartridge loading portion 104. The ink cartridge loading portion 104 is provided with an opening/closing front cover 115 for attaching or detaching an ink cartridge 200.

Figure 4:
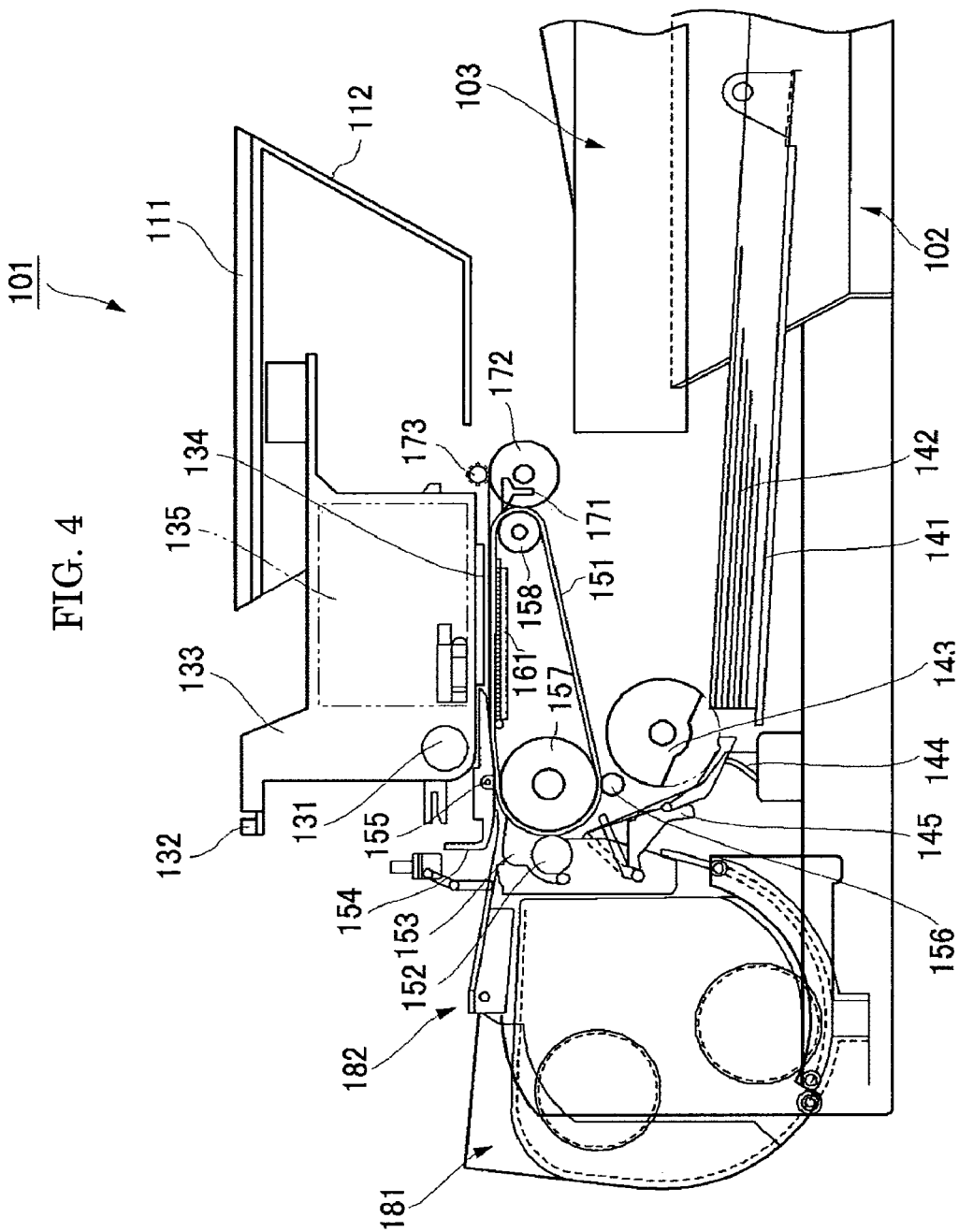
FIG. 4 is a schematic block diagram for explaining a whole constitution of the inkjet recording apparatus of the present invention.
Figure 5:
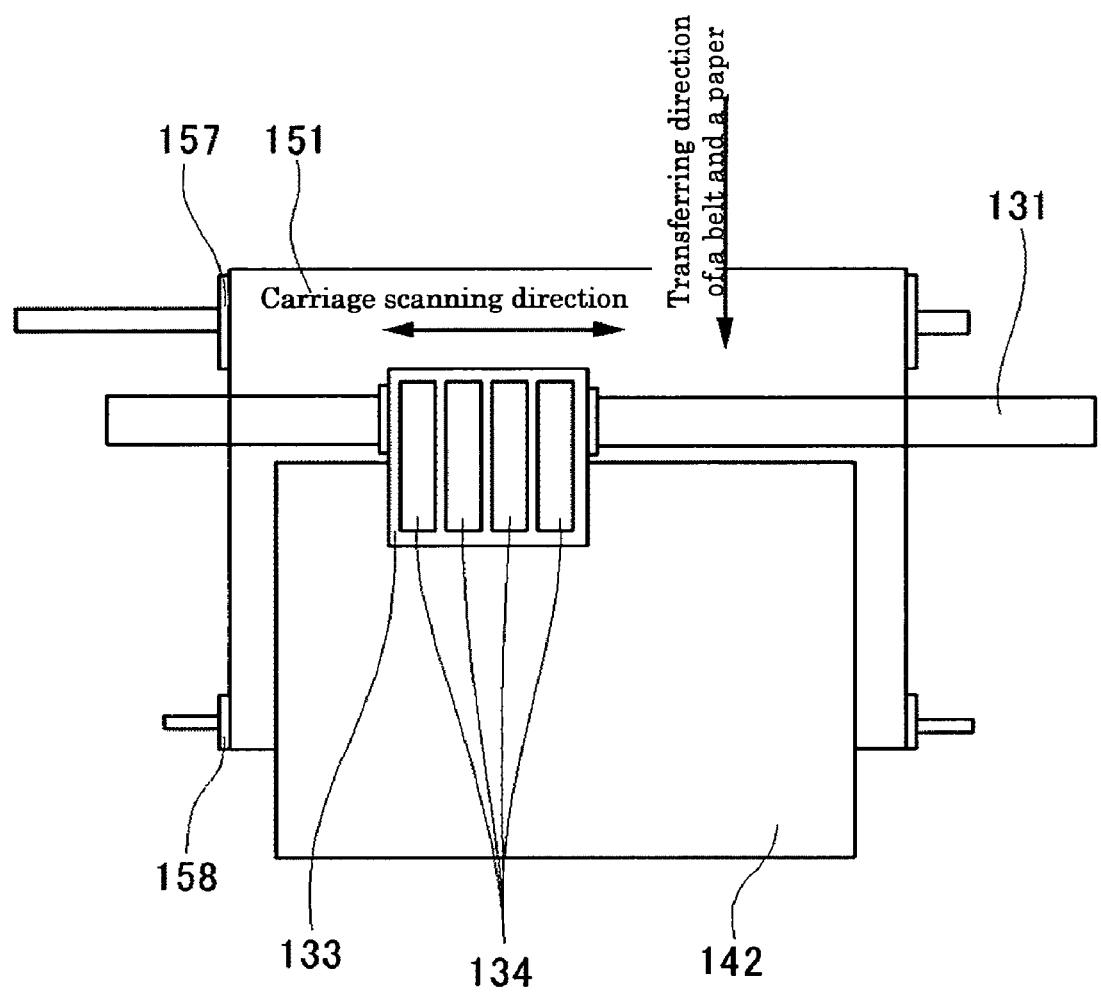
FIG. 5 is a schematic enlarged view for illustrating one example of an inkjet head used in the inkjet recording apparatus of the present invention.

As illustrated in FIG. 4 and FIG. 5, inside the apparatus main body 101, a guide rod 131 and a stay 132 which are guide members placed laterally on the right and left side plates are used to retain a carriage 133 so as to slide in a main scanning direction, and the carriage is moved and scanned by a main scanning motor (not illustrated) to the direction given by the arrow in FIG. 5.

The carriage 133 is provided with a recording head 134 made up of four inkjet recording heads for discharging recording ink droplets of individual colors of yellow (Y), cyan (C), magenta (M) and black (B) arranged in such a direction that a plurality of ink discharging ports are crossed in a main scanning direction, with the direction of discharging ink droplets faced downward.

The inkjet recording head constituting the recording head 134 is provided with a piezoelectric actuator such as a piezoelectric element, a thermal actuator which uses an electrothermal converter such as a heat element to utilize the change in phase resulting from the film boiling of a liquid, a shape memory alloy actuator which uses the change in metal phase resulting from the change in temperature, and an electrostatic actuator which uses an electrostatic force or the like as a unit configured to generate energy for discharging recording ink.

Further, the carriage 133 is equipped with a sub-tank 135 of each color for supplying each ink to the recording head 134. The recording ink of the present invention is supplied through a recording ink supply tube (not illustrated) from the ink cartridge 200 of the present invention filled at ink cartridge loading portion 104 and refilled to the sub-tank 135.

On the other hand, a paper feeding portion for feeding sheets 142 placed on the sheet placing portion (pressure plate) 141 of the paper feeding tray 102 is provided with a crescent gear (paper feeding gear 143) for separating the sheets 142 from the sheet placing portion 141 and supplying them one by one and a separation pad 144 which is opposed to the paper feeding gear 143 and made with a material large in friction coefficient. The separation pad 144 is urged to the paper feeding gear 143.

A transfer portion for transferring the sheets 142 fed from the paper feeding portion below the recording head 134 is provided with a transfer belt 151 for electrostatically adsorbing and transferring the sheets 142, a counter roller 152 for transferring the sheets 142 sent via a guide 145 from the paper feeding portion, with the sheets held with respect to the transfer belt 151, a transfer guide 153 for changing the direction of the sheets 142 sent above approximately perpendicularly at about 90 degrees to follow on the transfer belt 151, and a leading-end pressure gear 155 urged to the transfer belt 151 by the presser member 154. It is also provided with an electrification roller 156, which is a unit configured to electrify the surface of the transfer belt 151.

The transfer belt 151 is an endless belt, stretched between a transfer roller 157 and a tension roller 158 and able to rotate in a belt transfer direction. The transfer belt 151 is provided, for example, with a surface layer acting as a sheet adhesion face formed with a resin material of about 40 μm free of rheostatic control, for example, a copolymer of tetrafluoroethylene with ethylene (ETFE) and a back layer (middle resistive layer, ground layer) which is made with the same material as the surface layer to which rheostatic control is effected by carbon black. A guide member 161 is provided at the back of the transfer belt 151 so as to correspond to an imaging area by the recording head 134. It is noted that a paper discharge portion for discharging the sheets 142 recorded by the recording head 134 is provided with a separation nail 171 for separating the sheets 142 from the transfer belt 151, a paper discharge roller 172 and a paper discharge gear 173. A paper discharging tray 103 is arranged below the paper discharge roller 172.

A both-face paper feeding unit 181 is removably attached to the back face portion of the apparatus main body 101. The both-face paper feeding unit 181 captures the sheets 142 returned by a reverse rotation of the transfer belt 151 to reverse the sheets 142, thereby feeding the sheets again between the counter roller 152 and the transfer belt 151. It is noted that a manual paper feeding portion 182 is provided on the upper face of the both-face paper feeding unit 181.

A recording completion signal or a signal of indicating that the training end of the sheet 142 has arrived at a recording area, by which recording motions are completed to discharge the sheet 142 onto the paper discharging tray 103.

Then, when recording ink inside the sub-tank 135 is detected for the near end of residual quantity, the recording ink is refilled at a predetermined quantity from the ink cartridge 200 to the sub-tank 135.

In the inkjet recording apparatus, a housing of the ink cartridge 200 can be disassembled to exchange only an ink bag thereinside when recording ink inside the ink cartridge 200 is used up. Further, the ink cartridge 200 is able to supply the recording ink stably, even when constituted so as to fill the ink vertically from the front face. Therefore, where the ink cartridge is arranged, with the apparatus main body 101 being closed above, for example, a case where the ink cartridge is accommodated inside a rack or an object is placed on the upper face of the apparatus main body 101, the ink cartridge 200 can be exchanged easily.

In this instance, an explanation was made by referring to an example applied to a serial type (shuttle-type) inkjet recording apparatus at which the carriage scans. The inkjet recording apparatus of the present invention is also applicable to a line-type inkjet recording apparatus equipped with a line-type head.

Further, the inkjet recording apparatus and the inkjet recording method of the present invention are applicable to various types of recording by an inkjet recording method, and in particular preferably applicable, for example, to an inkjet recording printer, a facsimile device, a copying device, and a multifunction device of printer/facsimile/copier.

Next, an explanation will be made for an inkjet head.

Figure 6:
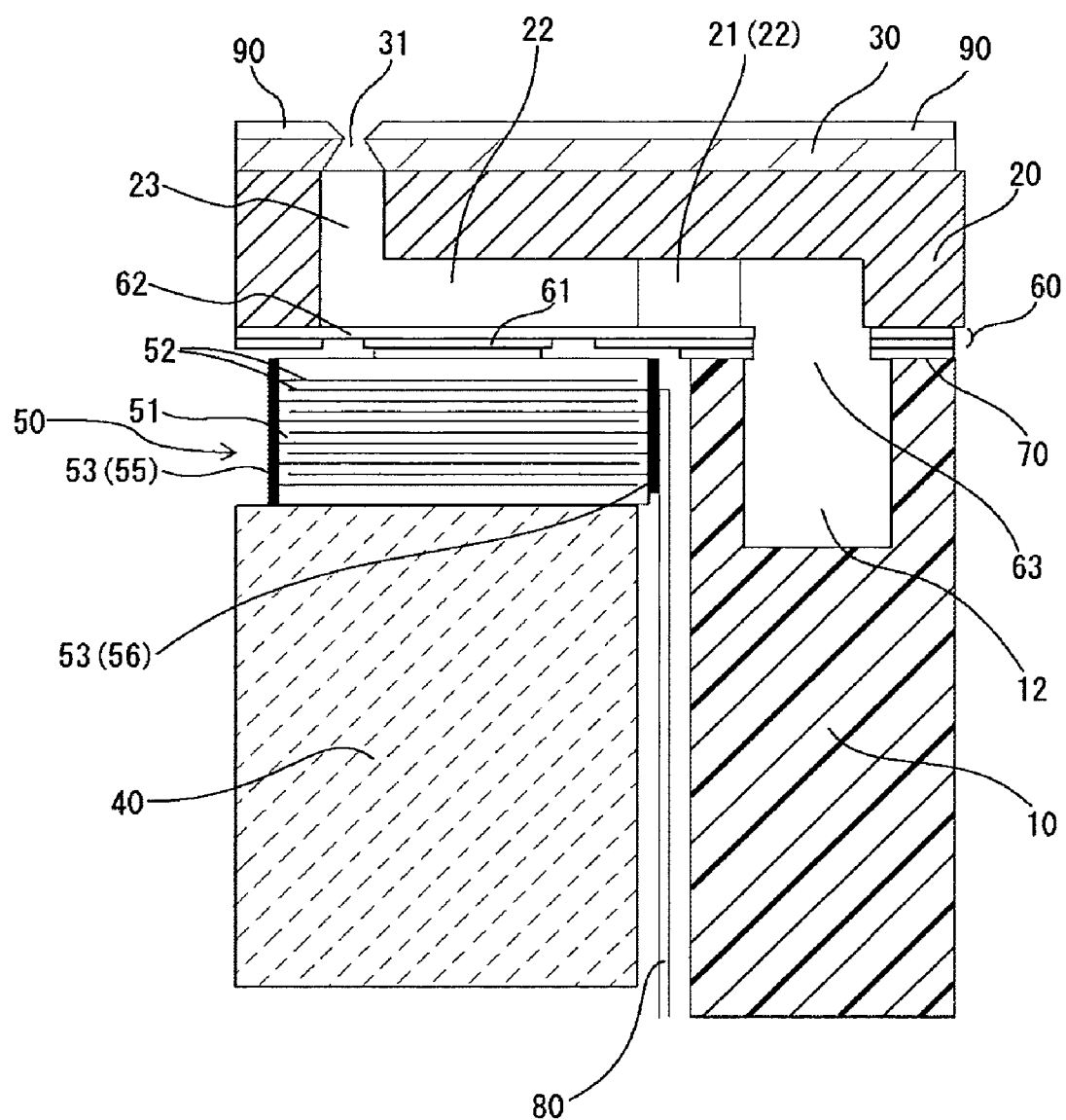
FIG. 6 is an enlarged element view for illustrating one example of the inkjet head used in the inkjet recording apparatus of the present invention.
Figure 7:
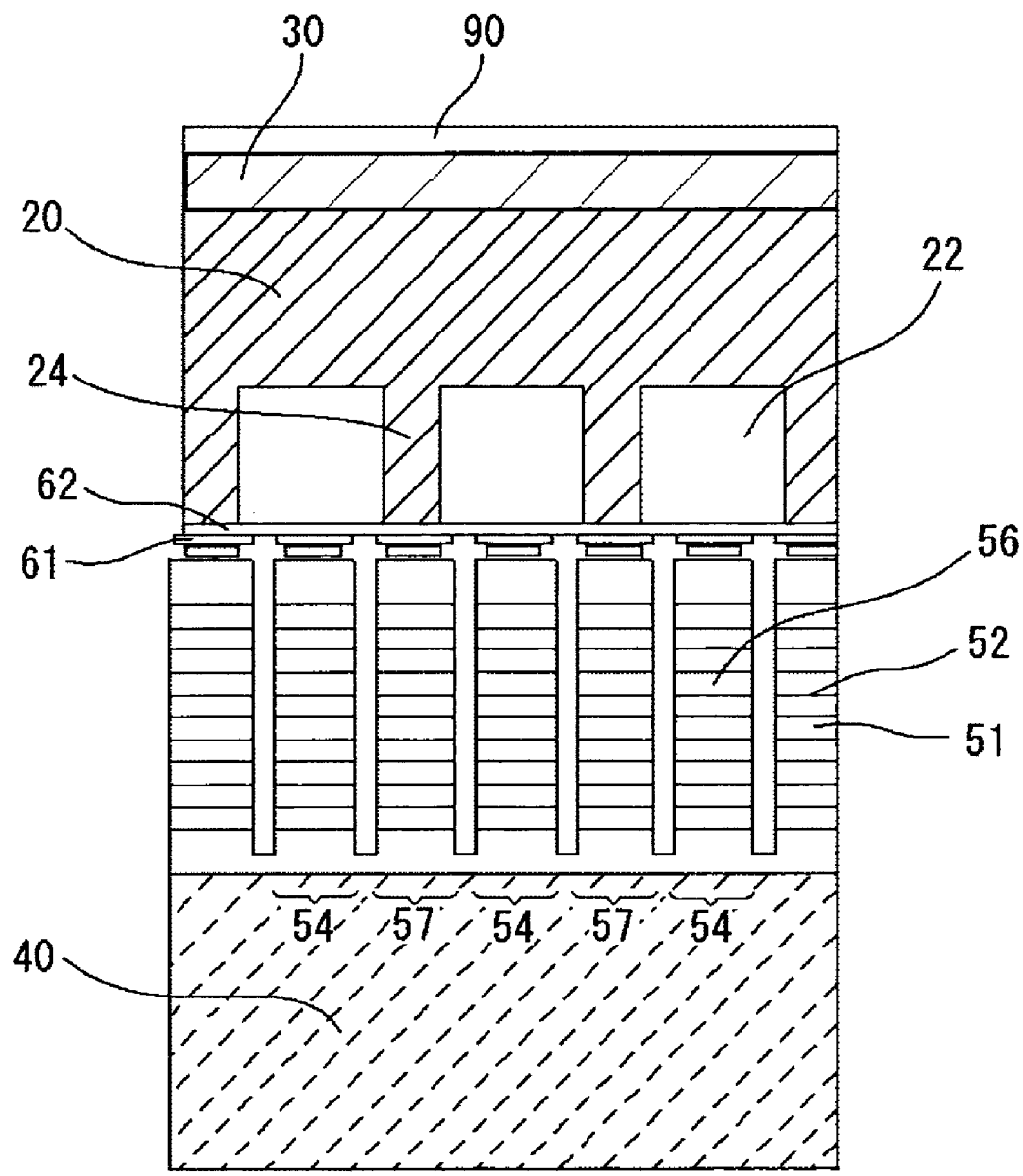
FIG. 7 is an enlarged sectional view in an inter-channel direction for illustrating major parts of the exemplified inkjet head used in the inkjet recording apparatus of the present invention.
Figure 8:
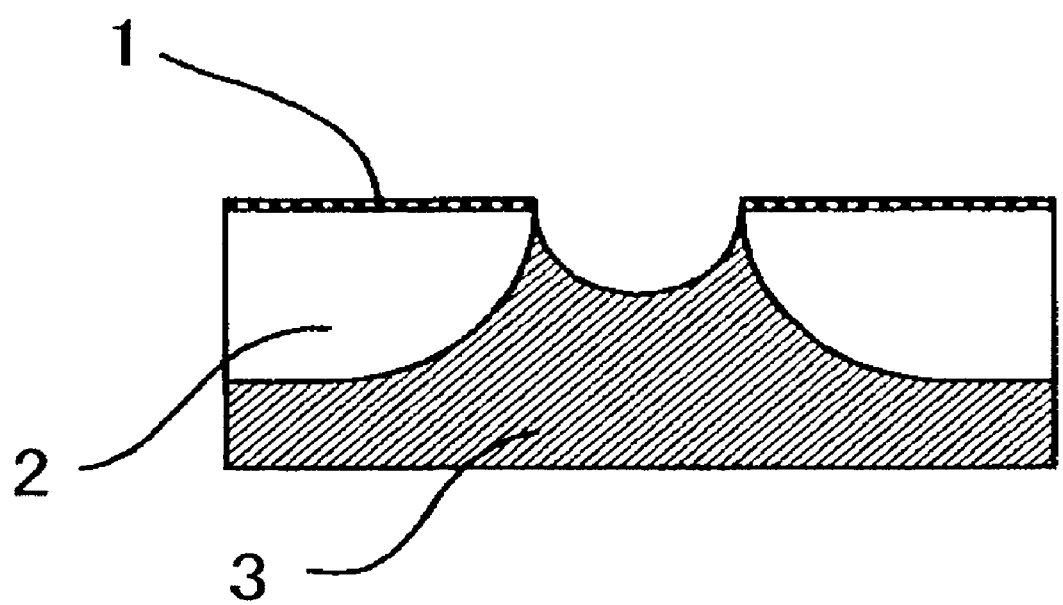
FIG. 8 is a schematic sectional view for illustrating one example of a nozzle plate on the inkjet head used in the inkjet recording apparatus of the present invention.

FIG. 6 is an enlarged view of elements of an inkjet head to which the present invention is applied. FIG. 7 is an enlarged sectional view in an inter-channel direction for illustrating major parts of the inkjet head.

The inkjet head is constituted with a frame 10 engraved so as to form an ink supply port (not illustrated) (ink is supplied from the surface direction to the rear direction in FIG. 6 (direction of the back face of paper)) and a common liquid chamber 12, a fluid resistance portion 21, a flow path plate 20 which is engraved so as to form a pressure liquid chamber 22 and provided with a port 23 for communicatively connecting to a nozzle 31, a nozzle plate 30 which forms the nozzle 31, a projected portion 61, a diaphragm 60 equipped with a diaphragm portion 62 and an ink flowing port 63, a laminated piezoelectric element 50 joined to the diaphragm 60 via a bonding layer 70, and a which fixes the laminated piezoelectric element 50. The is made with barium titanate-based ceramic and is joined to the laminated piezoelectric elements 50 which are arranged in two arrays.

The laminated piezoelectric element 50 is prepared by alternately laminating a piezoelectric layer 51 of lead zirconate titanate (PZT) with a thickness of 10 µm to 50 µm/one layer and an internal electrode layer 52 made with silver/palladium (AgPd) with a thickness of several µm/one layer. The internal electrode layer 52 is connected at both ends to an external electrode 53.

The laminated piezoelectric element 50 is divided into a comb shape by a half-cut dicing process and used as a driving portion 56 and a supporting portion 57 (non-driving portion) for each division (refer to FIG. 7).

Of the two external electrodes 53, one of them (connected to one end of the internal electrode layer 52 in the surface direction or the rear direction in the drawing (direction on the back face of paper)) is restricted in length by a process, for example, notching so as to be divided at the outer end by a half-cut dicing process, and these divisions are given as a plurality of individual electrodes 54. The other is not subjected to division by the dicing process but made conductive and given as a common electrode 55.

FPC (80) is joined by soldering to the individual electrodes 54 at the driving portion. Further, the common electrode 55 is provided with an electrode layer at the edge of the laminated piezoelectric element and turned around so as to be joined to the ground electrode of the FPC (80). A driver IC (not illustrated) is loaded into the FPC (80), thereby controlling a driving voltage applied to the driving portion 56.

The diaphragm 60 is provided with a thin-film diaphragm portion 62, an islet projected portion (island portion) 61 joined to the laminated piezoelectric element 50 which is given as a driving portion 56 formed at the center of the diaphragm portion 62, a thick-film portion including a beam joined to a supporting portion (not illustrated), and an opening port which is given as an ink flowing port 63 formed by laminating two layers of Ni plated film by electro molding method. The diaphragm portion is 3 µm in thickness and 35 µm in width (one side).

Connection of the islet projected portion 61 of the diaphragm 60 with the movable portion 56 of the laminated piezoelectric element 50 and that of the diaphragm 60 with the frame 10 are made by patterning a bonding layer 70 which contains a gap material.

The flow path plate 20 is engraved by using a silicon mono-crystalline substrate to give a fluid resistance portion 21 and a pressure liquid chamber 22 and provided with a through hole which acts as a communicatively connected port 23 at a position opposed to a nozzle 31 through patterning by an etching process.

A remaining portion after the etching is given as a partition wall 24 of the pressure liquid chamber 22. In this instance, the head is provided with a portion which is made narrow in etching width, and the portion is given as the fluid resistance portion 21.

The nozzle plate 30 is made with a metal material, for example, Ni plated film by an electro-molding process and provided with many nozzles 31, that is, fine discharging ports for shooting ink droplets. This nozzle 31 is formed in a horn shape (approximately cylindrical shape or trapezoidal cylindrical shape) as an internal shape (inner shape). Further, the nozzle 31 is from 20 µm to 35 µm in diameter at the outlet of ink droplets. The nozzles are to give 150 dpi at each array.

The nozzle plate 30 is provided on the ink discharging face (front face of the nozzle) with an ink repellent layer 90. A water repellent film prepared by PTFE-Ni eutectoid plating, electro-coating of a fluorine resin, vapor-deposition coating of a vaporizing fluorine resin (for example, fluoridated pitch), baking of a silicone-based resin or a fluorine-based resin after coating of a solvent or the like, is formed, depending on physical properties of ink, so that the shape of ink droplets and shooting properties can be stabilized to obtain a high-quality image.

<Ink Repellent Layer>
-Surface Roughness-

An ink repellent layer used in the present invention is preferably 0.2 μm or less in surface roughness of Ra. The surface roughness of Ra is made to be 0.2 μm or less, by which the remainder after wiping can be reduced.

FIG. 8 and FIG. 9A through FIG. 9C are sectional views for illustrating a nozzle plate of the inkjet head used in the present invention.

In the present embodiment, it is preferable that the nozzle plate 32 of the inkjet head is made by Ni electro-casting, the surface of which is provided with an ink repellent film 31 or a silicone resin film with a thickness of 1 Å (0.1 nm) or more, and the surface roughness is made to be Ra=0.2 μm or less. Further, the ink repellent film 31 is preferably 0.1 μm or more in thickness and more preferably 0.5 μm or more.

Figure 9A:
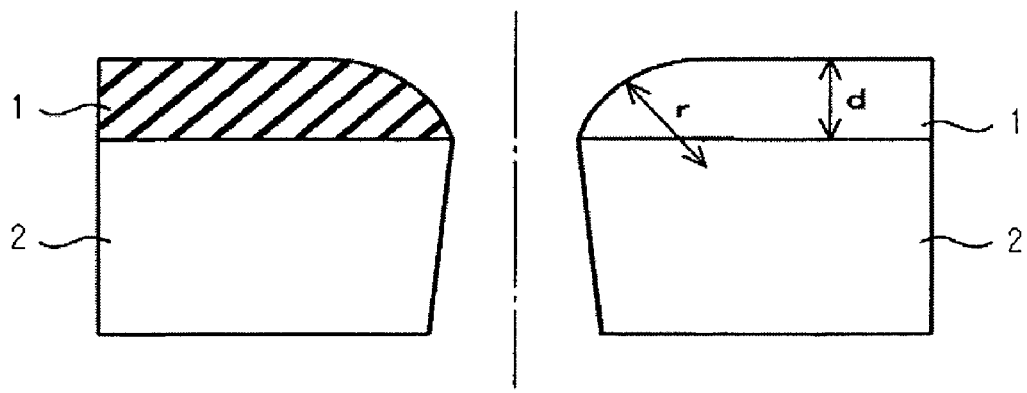
FIG. 9A is a schematic view for explaining the nozzle plate on the inkjet head used in the inkjet recording apparatus of the present invention.
Figure 9B:
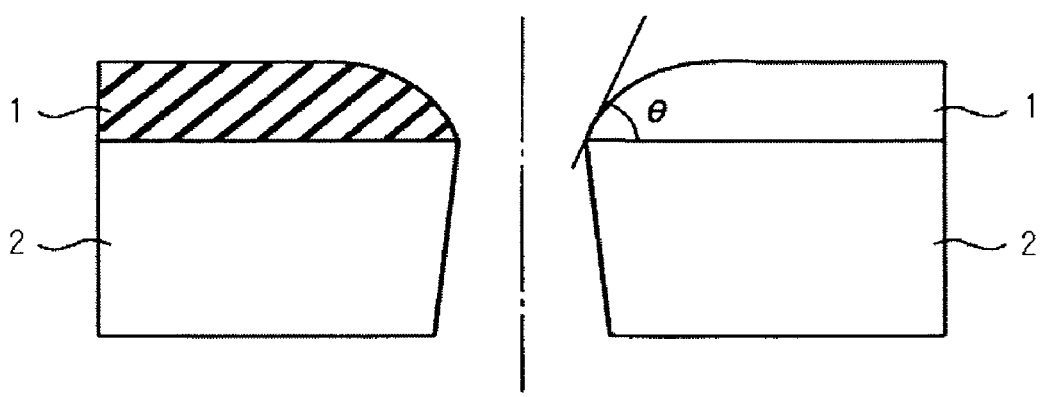
FIG. 9B is a schematic view for explaining the nozzle plate on the inkjet head used in the inkjet recording apparatus of the present invention.
Figure 9C:
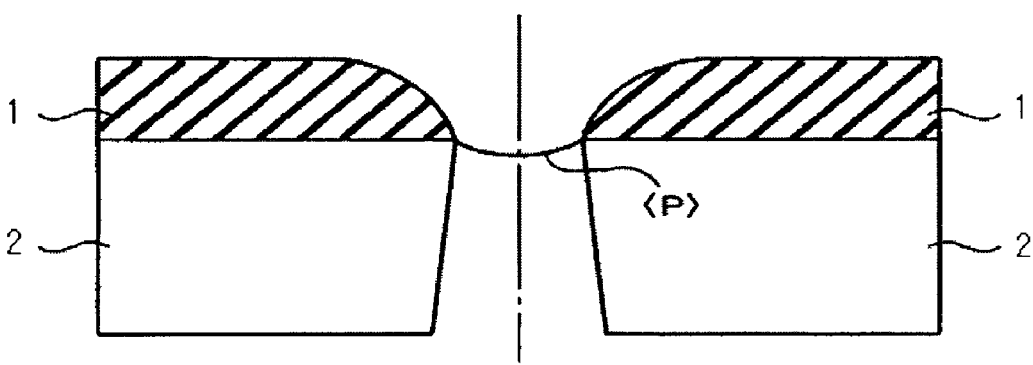
FIG. 9C is a schematic view for explaining the nozzle plate on the inkjet head used in the inkjet recording apparatus of the present invention.

As illustrated in FIG. 9C, when ink 3 is filled, the meniscus (liquid level) P resulting from a silicone resin film is formed on the border between the ink repellent film 31 and the nozzle plate 32.

An ink repellent film formed on a nozzle plate having an ink discharging opening (nozzle) of the inkjet head is formed so as to have an opening along with the ink discharging opening, and the opening is formed so that the cross-sectional area on the flat face perpendicular to the center line of the opening becomes gradually larger as the distance from the face of the nozzle plate increases in the vicinity of the opening.

The shape of the ink repellent film in the vicinity of the opening is preferably in a curved face. Further, the curvature radius of the curve in the vicinity of the opening of an ink repellent film at the cross section of a flat face including the center line of the opening is preferably greater than the thickness of the ink repellent film.

Further, it is preferable that a curve from the brim of the opening of the ink repellent film at the cross section on a flat face including the center line of the opening to the vicinity of the opening is approximately an arc curve and the curvature radius of the arc is greater than the thickness of the ink repellent film.

It is also preferable that a tangent line passing through the brim of the opening of the ink repellent film at the cross section of the flat face including the center line of the opening forms an angle of 90 degrees with respect to the surface of the nozzle member including the edge thereof.

The opening of the nozzle plate 32 is formed in such a way that the cross section of the flat face perpendicular to the center line indicated by the single dot and dash line in FIG. 9 A through FIG. 9C is approximately circular at the center of the center line. Further, the ink repellent film 31 formed on an ink discharging face of the nozzle plate 32 is formed so that the cross-sectional area of the opening of the flat face perpendicular to the center line becomes larger as it moves away from the nozzle plate 32.

More specifically, as illustrated in FIG. 9A, the opening of the ink repellent film 31 is provided with a curve from the brim of the opening of the nozzle plate 32 to the vicinity of the opening, which is given a round shape with a curvature radius of r. The curvature radius of r is preferably greater than the thickness of d except for the vicinity of the opening of the ink repellent film 31.

The thickness of d is a thickness at parts other than the round part which is the opening of the ink repellent film 31 and may be preferably a maximum thickness of the ink repellent film.

As described above, the opening of the ink repellent film 31 connected to the opening of the nozzle plate 32 is shaped to be free of approximately sharp edges (a smooth curve free of acuminate portions) and given a curve free of catching portions, thereby making it possible to remove such a defect where a wiper made with a material, for example, rubber, is used to wipe, sharp portions are caught by the wiper and the ink repellent film 31 is detached from the nozzle plate 32.

Further, as illustrated in FIG. 9B, it is preferable that a tangent line passing through the brim of the opening of the ink repellent film 31 at the cross section of the flat face including the center line of the opening of the nozzle plate 32 forms an angle θ of less than 90 degrees with respect to the surface of the nozzle plate 32 including the brim of the opening of the nozzle plate 32 connected to the brim of the opening.

Since an angle of θ which a tangent line at the brim of the opening of the ink repellent film 31 forms with the surface of the nozzle plate is less than 90 degrees, as illustrated in FIG. 9C, the meniscus (liquid level) P is stably formed at a border between the ink repellent film 31 and the nozzle plate 32. Therefore, such a possibility can be greatly reduced that the meniscus P is formed at other portions. As a result, a meniscus-forming face is made stable, by which ink can be jetted stably and favorably when an image is formed by using an image forming apparatus in which an inkjet head including the nozzle plate 32 is used.

The silicone resin used in the present embodiment is preferably a liquid silicone resin which cures at room temperature and more preferably that involved in hydrolysis reaction. SR 2411 manufactured by Dow Corning Toray Co., Ltd. was used in the examples to be described later.

Table A below shows the results of evaluation made for the shape of the nozzle plate 32 from the brim of the opening to the vicinity of the brim of the opening on the ink repellent film 31 at the inkjet head of the present embodiment, ink retained around the nozzle, edge detachment, and jetting stability.

TABLE A

| Shape of edge | | Ink retained | Edge detachment | Jetting stability |
|---|---|---|---|---|
| Sharp edge found | | Partially found | Found | Favorable |
| No sharp edge found (round shape) | θ ≦ 90° | Not found | Not found | Favorable |
| | θ > 90° | Not found | Not found | Poor |
| | r ≧ d | Not found | Not found | Favorable |
| | r < d | Not found | Partially found | Poor |

The results of Table A reveal that where approximately sharp edges are included in the edge portion of the ink repellent film 31 (near the brim of the opening), ink is retained around the nozzle, and the edge is detached when the ink is wiped.

Figure 10A:
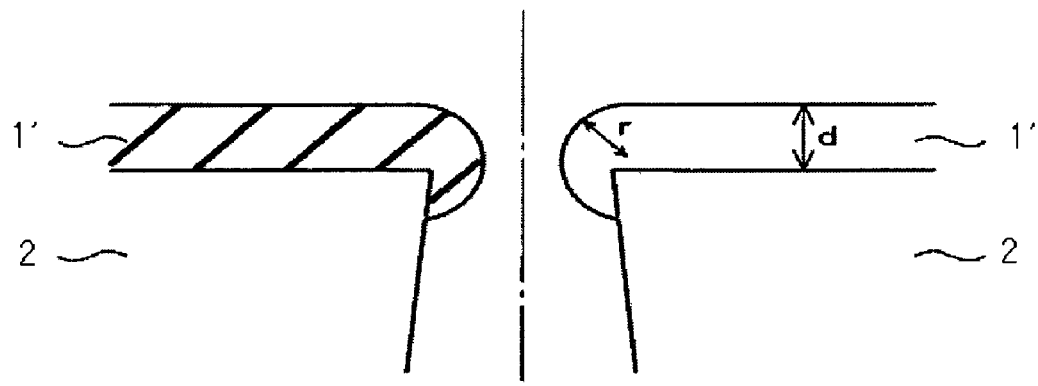
FIG. 10A is a schematic view for explaining a nozzle plate on the inkjet head for comparison.
Figure 10B:
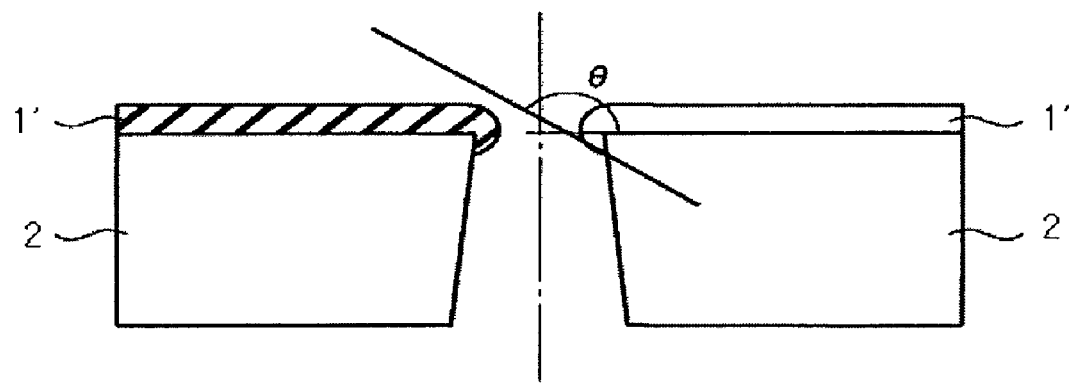
FIG. 10B is a schematic view for explaining another nozzle plate on the inkjet head for comparison.

There is found no ink retained where the ink head has round shape, i.e. no shape edge. However, a partial edge detachment is found, where r is smaller than d as illustrated in FIG. 10A. Where θ is greater than 90 degrees as illustrated in FIG. 10B, ink droplets are unstably jetted.

Figure 10C:
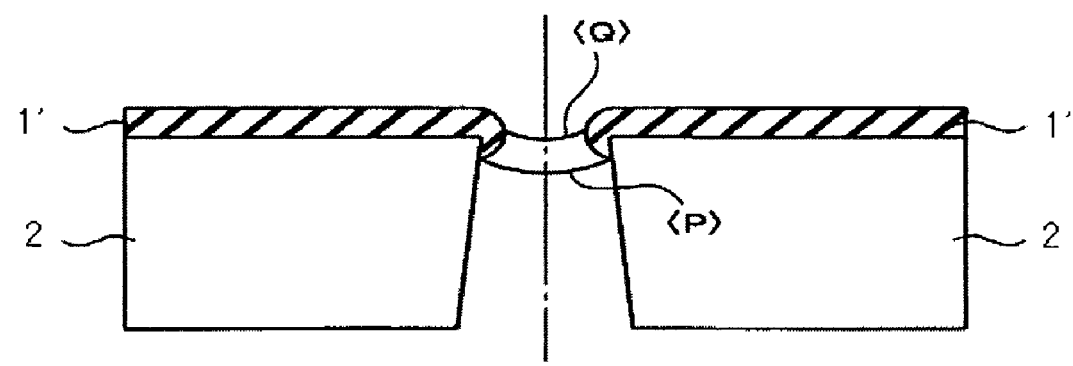
FIG. 10C is a schematic view for explaining still another nozzle plate on the inkjet head for comparison.

Further, where r is smaller than d and θ is greater than 90 degrees as illustrated in FIG. 10C, there are cases where the meniscus (liquid level) P is formed at a border between the ink repellent film 31 and the nozzle plate 32 on ink filling, and where the meniscus Q is formed at a projected portion toward the center of the opening on the ink repellent film 31' (a portion at which the cross-sectional area perpendicular to the center line of the opening is made smallest). As a result, there may be found a variance in jetting stability of ink when an inkjet recording apparatus equipped with an inkjet head including the nozzle plate 32 is used to record images.

Next, an explanation will be made for a method for producing a nozzle member of the inkjet head related to the present embodiment.

Figure 11:
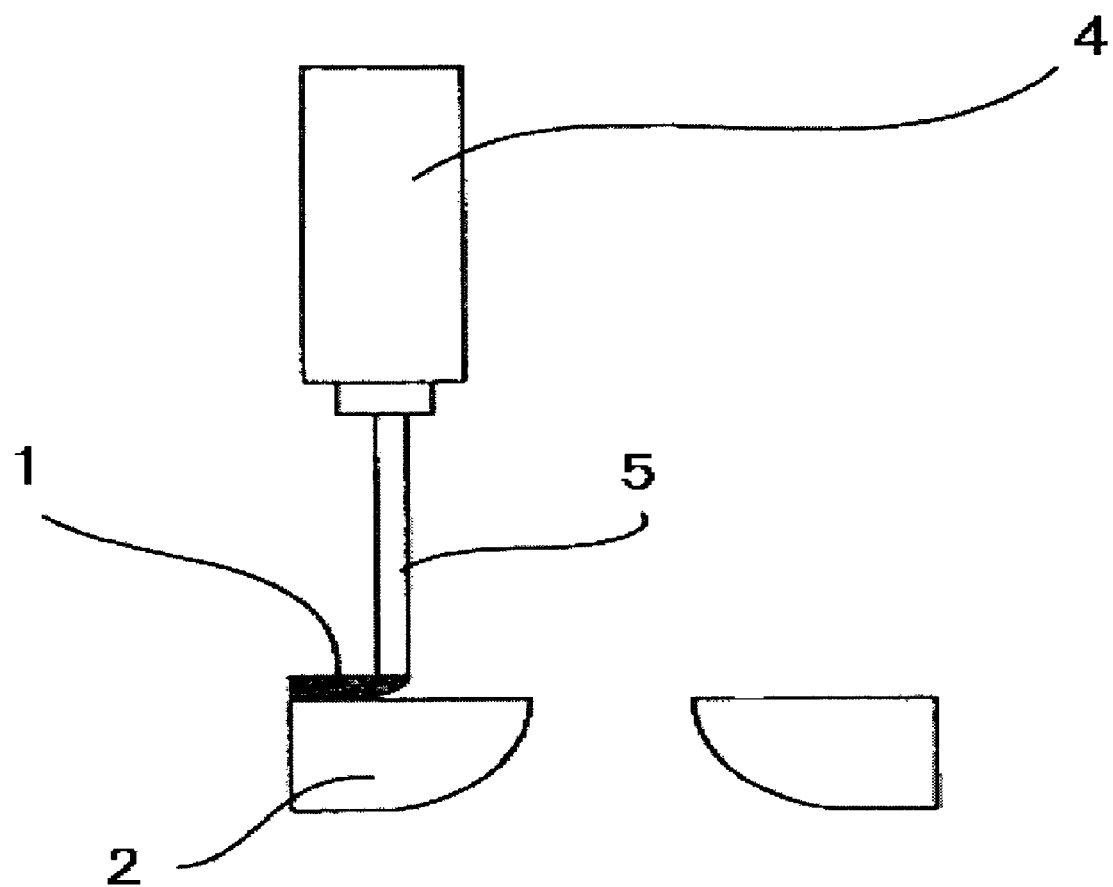
FIG. 11 is a view for illustrating a state at which a silicone resin is coated by using a dispenser to form a ink repellent film.

FIG. 11 is a view for illustrating a constitution in which a silicone resin is coated by using a dispenser 34 related to the present embodiment to form the ink repellent film 31.

A dispenser 4 is arranged for coating a silicone solution on the ink discharging face of the nozzle 32 prepared by Ni electro-casting, and the dispenser 4 is scanned while silicone is discharged from the leading end of a needle 35 in such a way that the nozzle plate 32 is kept away from the leading end of the needle 35 at a predetermined distance, by which a silicone resin film can be formed selectively on the ink discharging face of the nozzle plate 32, as illustrated in FIG. 8 and FIG. 9A through FIG. 9C.

The silicone resin used in the present embodiment was a silicone resin which cures at room temperature, that is, SR 2411 (Dow Corning Toray Co., Ltd., viscosity: 10 mPa·s). However, there was found some silicone entered around the nozzle port and the back face of the nozzle plate. The thus selectively formed silicone resin film was 1.2 μm in thickness and 0.18 μm in surface roughness (Ra).

Figure 12A:
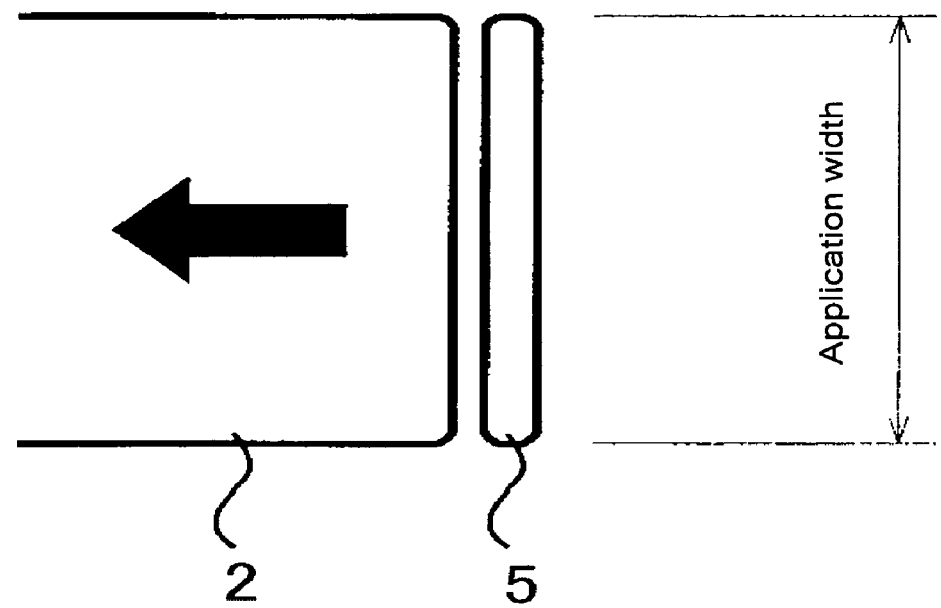
FIG. 12A is a view for showing a relationship between a coating hole at the needle tip used in the present invention and a coating width on the nozzle plate, which is an object to be coated.

As illustrated in FIG. 12A, a coating hole at the leading end of the needle 35 related to the present embodiment is secured to be wide only by the width to be coated on the nozzle plate 32, which is a target to be coated. This fact makes it possible to completely coat all over the target to be coated by scanning the dispenser 34 only once toward the coating direction.

Figure 12B:
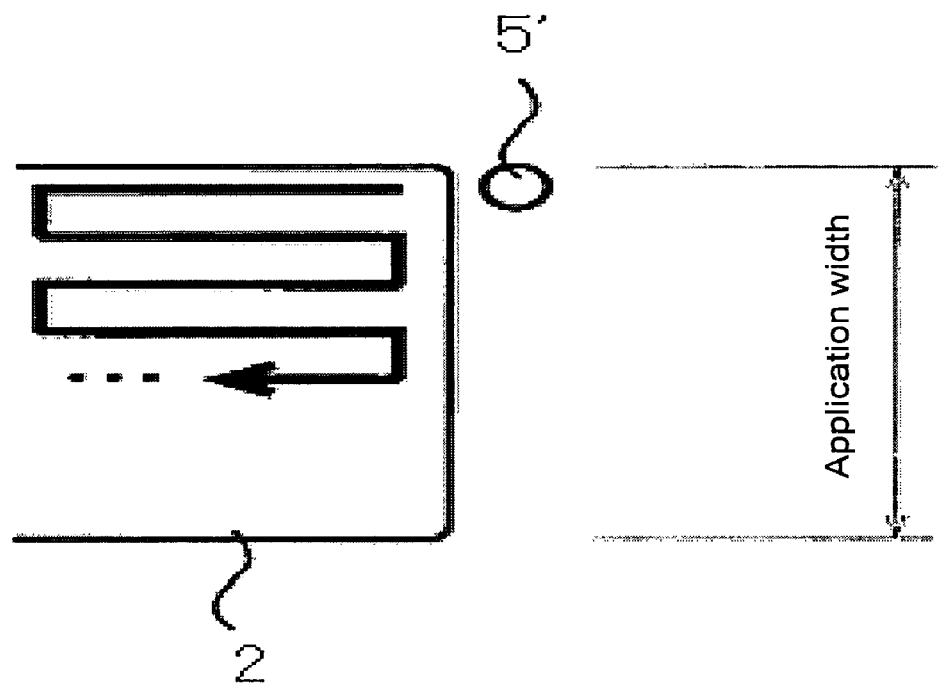
FIG. 12B is a view for showing a relationship between a general needle tip and a coating width on the nozzle plate, which is an object to be coated.

In other words, a scanning direction for coating motions can be set only in one direction, thereby eliminating the necessity for changing the direction or conducting a reverse scanning as in FIG. 12B.

In this instance, as illustrated in FIG. 12B, the leading end of a general-type needle 35 is much narrower than the width to be coated on the nozzle plate 32, which is a target to be coated. Therefore, in order to completely coat all over the target to be coated, it is necessary to move the target by changing the scanning direction for coating motions by 90 degrees or conducting a reverse scanning in several different directions, thus making it difficult to coat all over the target to be coated at a uniform thickness.

According to the present embodiment, a coating hole at the leading end of the needle 35 is secured to be wide only by the width to be coated on the nozzle plate 32, which is a target to be coated. Thereby, the target to be coated can be coated all over at a uniform thickness to provide an accurate surface finishing.

Figure 13:
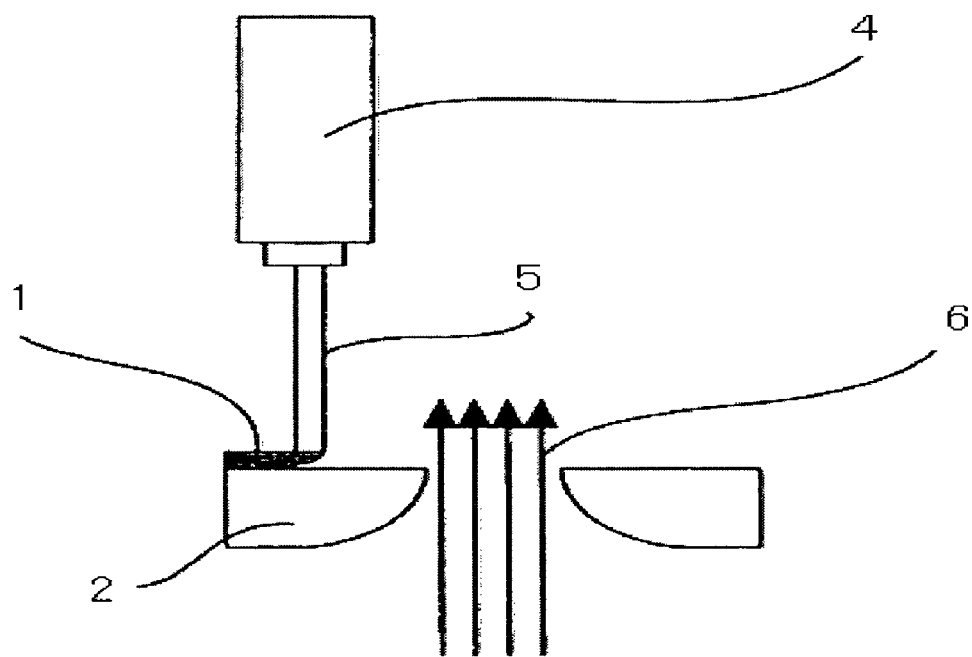
FIG. 13 is a view for illustrating coating motions when the dispenser is used.

FIG. 13 is a view for illustrating coating motions when the dispenser 34 of the present embodiment is used. Although similar in basic constitution as in FIG. 11, silicone is coated while a gas 36 is jetting from a nozzle port (opening) of the nozzle plate 32. The gas 36 may include any type of gas which is less likely to cause chemical reactions with silicone to be coated. For example, air may be used.

The gas 36 is coated while being jetted from the nozzle port, thereby making it possible to form a silicone resin film only on the surface of the nozzle except for the nozzle port of the nozzle plate 32.

Figure 14:
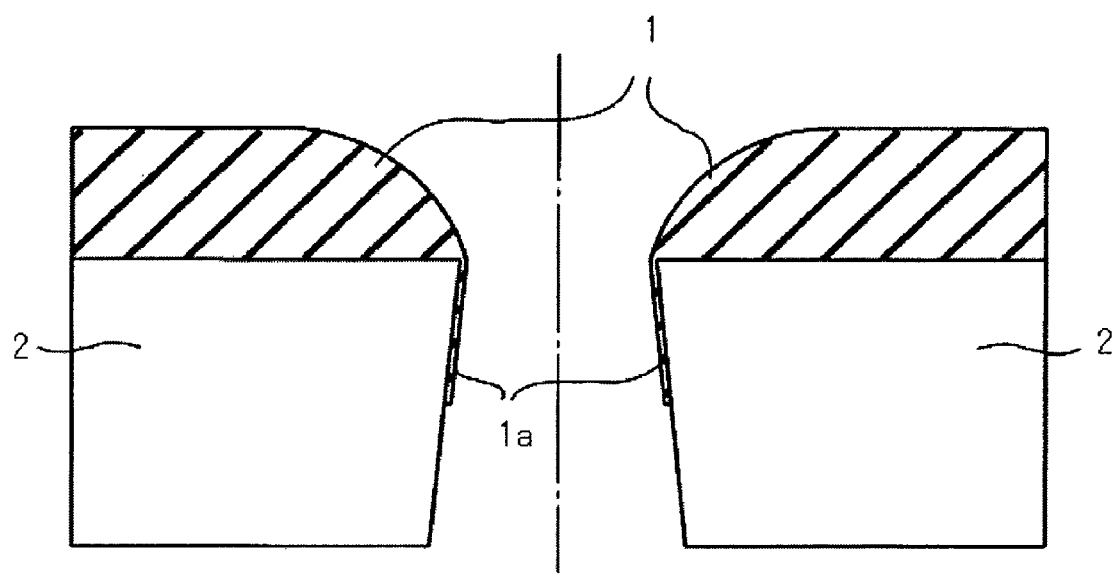
FIG. 14 is a view for illustrating a state at which an ink repellent layer of the silicone resin is formed on the inner wall of the nozzle up to a desired depth.

Further, as described above, the gas 36 is not jetted but a similar silicone resin is used to coat, thereby the silicone resin is allowed to enter into a predetermined depth. Thereafter, the gas 36 is jetted from the nozzle 32, thus making it possible to form an ink repellent layer of the silicone resin up to a desired depth on the inner wall of the nozzle (for example, about several μm), as illustrated in FIG. 14. In other words, besides the ink repellent film 31 on the ink discharging face, it is possible to form quite a thin ink repellent film 31a (ink repellent film on the inner wall of the opening) up to a predetermined depth from the brim of the opening on the nozzle plate 32.

The thus prepared ink repellent film 31 of the nozzle plate was wiped by using EPDM rubber (rubber hardness of 50 degrees). As a result, after the ink repellent film 31 of the nozzle plate was wiped 1000 times, it was able to retain favorable ink repellency. Further, a nozzle member on which the ink repellent film was formed, was submerged into ink at 70° C. for 14 days. As a result, ink repellency was successfully retained, which remained unchanged thereafter.

Figure 15:
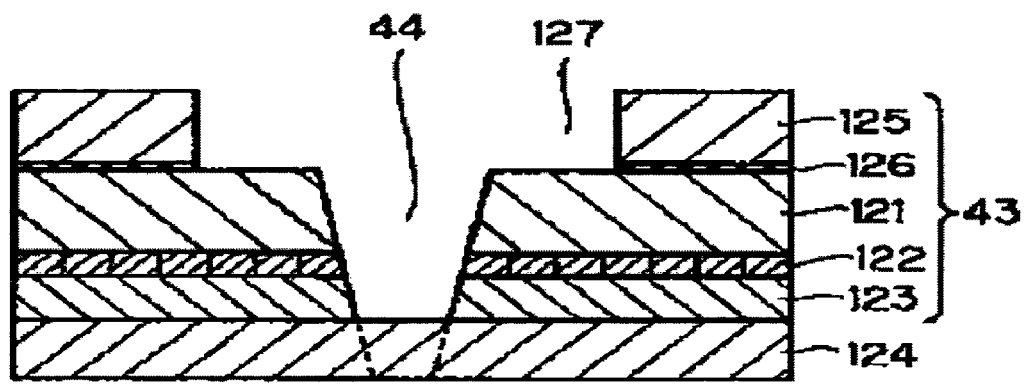
FIG. 15 is a view for illustrating one example of the inkjet head on the inkjet recording apparatus of the present invention and also a state at which the nozzle port is formed by excimer laser machining.

FIG. 15 is a view for illustrating one example of the inkjet head of the present invention and also a state at which the nozzle port is formed by excimer laser machining. The nozzle plate 43 is such that in which a resin member 121 is joined with a highly rigid member 125 with a thermoplastic adhesive agent 126. The resin member 121 is prepared by sequentially laminating a $SiO_2$ thin film layer 122 and a fluorine-based water repellent layer 123 on the surface thereof. The resin member 121 is provided with a nozzle port 44 having a predetermined diameter, and the highly rigid member 125 is provided with a port 127 which is communicatively connected to the nozzle port 44. The $SiO_2$ thin film layer 122 is formed by a method which is relatively low in thermal consumption, that is, in which the film can be formed in a temperature range where the resin member is not thermally influenced. More specifically, preferable are sputtering, ion beam enhanced deposition, ion plating, CVD (chemical vapor deposition), P-CVD (plasma chemical vapor deposition) and others.

It is desirable in terms of the processing time and material cost to make the $SiO_2$ thin film layer 122 as thin as possible to such an extent as to secure adhesion. Where the layer is excessively thick, there may be found a problem in processing a nozzle port by excimer laser. In other words, even where the resin member 121 is neatly machined into a nozzle port shape, a part of the $SiO_2$ thin film layer 122 is not satisfactorily treated, with some of the layer not being treated. Therefore, specifically, when consideration is given to a fact that adhesion is secured and no $SiO_2$ thin film layer 122 is left untreated on treatment by the excimer laser, the thickness is preferably in a range of 1 Å to 300 Å (0.1 nm to 30 nm) and more preferably from 10 Å to 100 Å (1 nm to 10 nm). Experimental results revealed that the thickness of the $SiO_2$ thin film of 30 Å (3 nm) yielded a sufficient adhesion and no problem was found at all in relation to excimer laser machining. Further, the $SiO_2$ thin film layer 122 was left untreated only to a slight extent at 300 Å (30 nm) and still usable. Where the thickness exceeded 300 Å (30 nm), a relatively large part of the film layer was left untreated and the nozzle was deformed to an unusable extent.

The ink repellent layer may be made with any material, as long as it is able to repel ink. Specifically, included are fluorine-based water-repellent materials and silicone-based water repellent materials.

Various materials are known as fluorine-based water repellent materials. In this instance, a mixture of perfluoro polyoxetane with modified perfluoro polyoxetane (product name: Optool DSX, manufactured by Daikin Industries, Ltd.) is deposited to give a thickness of 1 Å to 30 Å (0.1 nm to 3 nm), thereby obtaining a necessary water repellency. Experimental results revealed that there was no difference in water repellency and wiping resistance when the thickness of Optool DSX was 10 Å, 20 Å or 30 Å. Thus, with the cost taken into account, the thickness is preferably from 1 Å to 20 Å (0.1 nm to 2 nm). However, some of ink to be used may be kept for performance for a longer time when a water repellent film is made thicker in view of reliability. In this instance, the thickness is preferably from 100 Å to 200 Å (10 nm to 20 nm). Further, an adhesive tape 124 prepared by coating an adhesive material on a resin-made film is pasted on the surface of the fluorine-based water repellent layer 123, thereby giving a supplementary function on treatment by an excimer laser. Silicone-based water repellent materials are also usable.

The silicone-based water repellent materials include a silicone resin and an elastomer which can cure at room temperature. They are preferably coated on the surface of a base material and subjected to polymerization and curing when allowed to stand at room temperature in the atmosphere, thereby forming an ink repellent film.

The above-described silicone-based water repellent material is a heat-curable liquid silicone resin or elastomer. The material may be such that which is coated on the surface of a base material and cured after heat treatment, thereby forming an ink repellent film.

The silicone-based water repellent material may be an ultraviolet-ray curable liquid silicone resin or elastomer, which is coated on the surface of a base material and cured on exposure to ultraviolet rays, thereby forming an ink repellent film.

The silicone-based water repellent material is preferably 1000 cp (centipoise) or less in viscosity.

Figure 16:
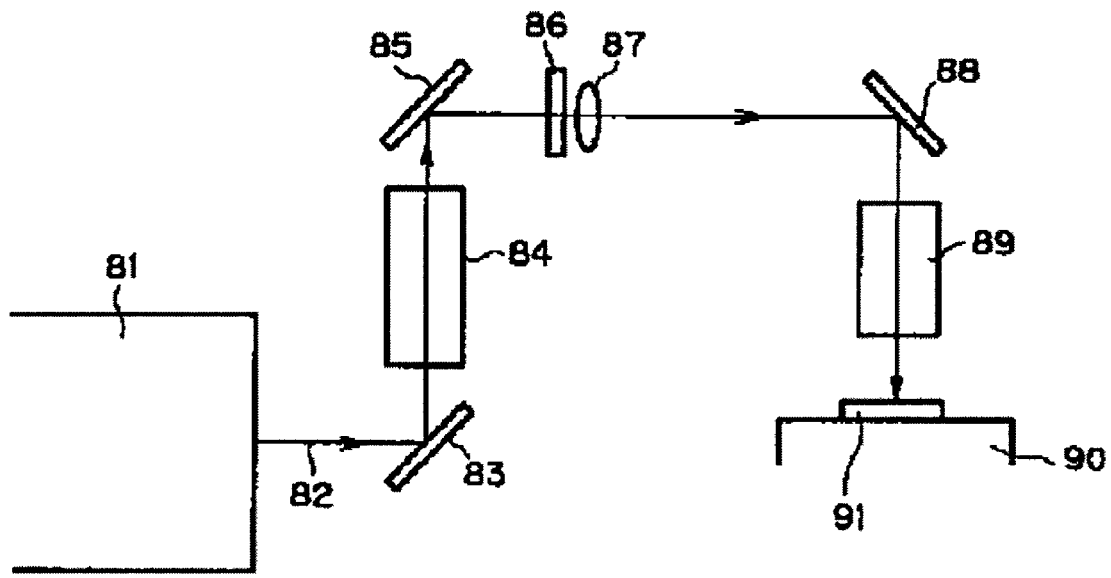
FIG. 16 is a view for illustrating a constitution of the excimer laser machine used on machining the nozzle port.

FIG. 16 is a view for illustrating a constitution of the excimer laser machine used in machining the nozzle port.

Excimer laser beam 82 emitted from a laser oscillator 81 is reflected by mirrors 83, 85, 88, and led to a processing table 90. A beam expander 84, a mask 86, a field lens 87 and an image forming optical system 89 are provided at predetermined positions on a light path until the laser beam 82 arrives at the processing table 90 so that an optimal beam can be given to a work piece. The work piece (nozzle plate) 91 is placed on the processing table 91 to receive the laser beam. The processing table 90 is constituted with a known XYZ table or the like and designed to move the work piece 91, when necessary, and radiate the laser beam at a desired point. In this instance, the laser was explained by referring to excimer laser. A laser is usable in various types as long as it is an ultraviolet-ray laser of a short wavelength by which ablation processing can be conducted.

FIG. 17A to FIG. 17E are views for graphically illustrating a step of manufacturing a nozzle plate in a method for manufacturing the inkjet head of the present invention.

Figure 17A:
FIG. 17A is a view for illustrating a base material of the nozzle forming member used in a step of manufacturing the nozzle plate in manufacturing the inkjet head.

FIG. 17A illustrates a material which is used as a base material of a nozzle forming member. In this instance, a polyimide film manufactured by Dupont Inc., for example, Kapton (product name) film free of particles is used as a resin film 121. Regarding a general-use polyimide film, particles of $SiO_2$ (silica) or others are added to the film material in view of the handling property (lubricating property) in a roll-film handling apparatus. When a nozzle port is machined by the excimer laser, particles of $SiO_2$ (silica) are poorly machined by the excimer laser, thereby resulting in deformation of the nozzle. For this reason, in the present invention, such a film is used that the particles of $SiO_2$ (silica) are not added. Further, as a base material of the plate, Upilex, a polyimide film manufactured by Ube Industries, Ltd., may be used. Upilex is extremely fine in particles and can be used as it is, as a result of being free from any machining problems.

Figure 17B:
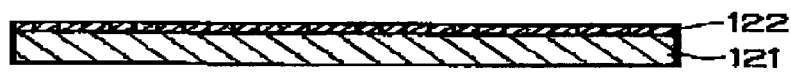
FIG. 17B is a view for illustrating a step of forming a $SiO_2$ thin film layer on the surface of a resin film.

FIG. 17B is a view for illustrating a step of forming a $SiO_2$ thin film layer 122 on the surface of the resin film 121. The $SiO_2$ thin film layer 122 is desirably formed by a sputtering method which is conducted at a vacuum chamber, with the preferable film thickness being in a range from about 1 Å to 300 Å (0.1 nm to 30 nm). In this instance, the film is formed from about 10 Å to 100 Å (1 nm to 10 nm) in thickness. The sputtering is effectively conducted by a method in which after Si is sputtered, the surface of Si is exposed to $O_2$ ion, thereby forming a $SiO_2$ film, due to a fact that the $SiO_2$ film is improved in adhesion on the resin film 121 to provide uniform and compact film, which is more effective in improving the wiping resistance of water repellent film.

Figure 17C:
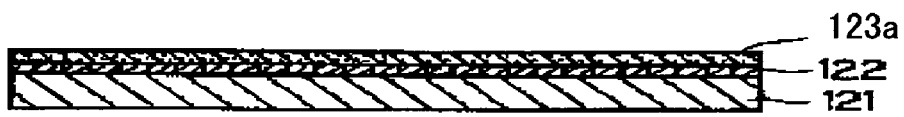
FIG. 17C is a view for illustrating a step of coating a fluorine-based water repellent.

FIG. 17C is a view for illustrating a step of coating a fluorine-based water repellent 123a. This repellent can be coated by methods such as spin coating, roller coating, screen printing and spray coating. A film form method by vacuum deposition is more effective because of improvement in adhesion of the water repellent film. Further, the vacuum deposition is conducted, as it is, at a vacuum chamber after formation of the $SiO_2$ thin film layer 122 given in FIG. 17B, thereby providing better effects. Conventionally, after formation of the $SiO_2$ thin film layer 122, a work piece is once taken out from the vacuum chamber and impurities or the like may attach on the surface, which may affect the adhesion of the film layer. It is noted that various types of fluorine-based water repellent materials are known. In this instance, perfluoro polyoxetane, modified perfluoro polyoxetane, or a mixture of them is used as a fluorineamorphous compound, thus making it possible to obtain water repellency required for ink. The previously described Optool DSX manufactured by Daikin Industries, Ltd. is from time to time called "alcoxysilane terminal modified perfluoropoly ether."

Figure 17D:
FIG. 17D is a view for illustrating a step of allowing the film to stand in the atmosphere after deposition of the water repellent film.

FIG. 17D is a view for illustrating a step of allowing the water repellent film after vacuum deposition to stand in the atmosphere. This step makes it possible that the fluorine-based water repellent 123a and the $SiO_2$ thin film layer 122 are chemically bonded through water contained in the atmosphere to form a fluorine-based repellent layer 123.

Figure 17E:
FIG. 17E is a view for illustrating a step of attaching an adhesive tape thereon.

FIG. 17E is a view for illustrating a step of pasting an adhesive tape 124. The adhesive tape 124 is pasted on the face on which the fluorine-based water repellent layer 123 is coated. The adhesive tape 124 should be pasted so as not to generate bubbles. There may be a case where a nozzle port formed at a position where bubbles are present is deteriorated in quality by attachments on machining due to the presence.

Figure 17F:
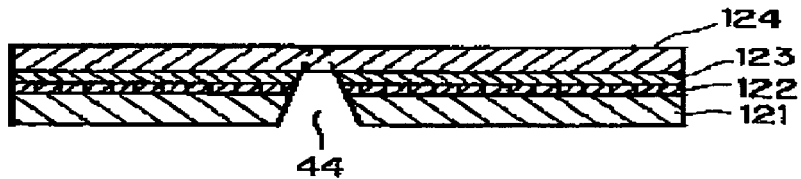
FIG. 17F is a view for illustrating a step of machining the nozzle port.

FIG. 17F is a view for illustrating a step of machining a nozzle port 44. In this step, the excimer laser is radiated from the side of polyimide film 121 to form the nozzle port 44. After the nozzle port 44 is machined, the adhesive tape 124 is removed to use the nozzle port. It is noted that an explanation was omitted about a highly rigid member 125 used in increasing the rigidity of the nozzle plate 43 given in FIG. 15. This step is preferably conducted between the step given in FIG. 17D and that given in FIG. 17E.

Figure 18:
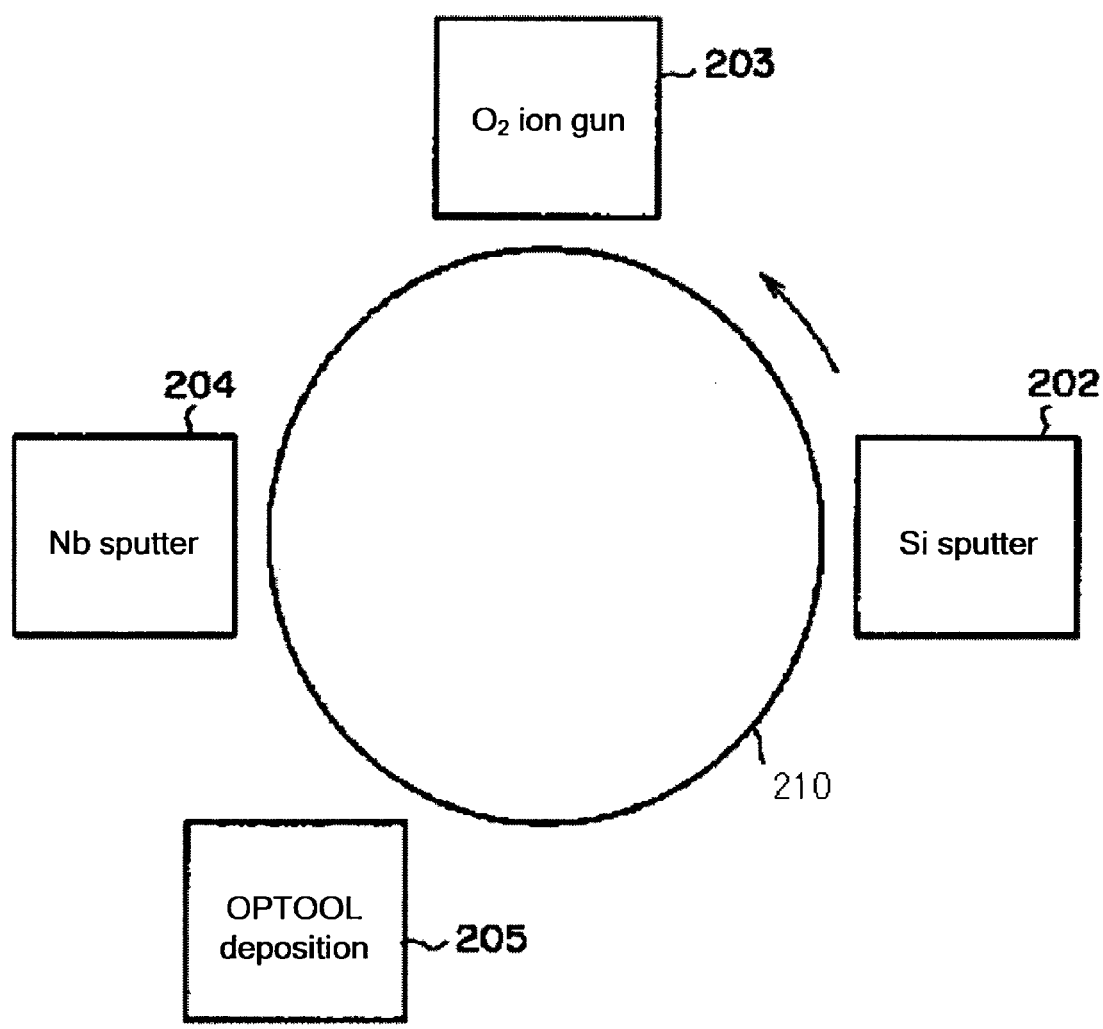
FIG. 18 is a view for briefly illustrating an apparatus to be used on manufacture of the inkjet head by a method for manufacturing the inkjet head.

FIG. 18 is a view for briefly illustrating an apparatus used in manufacturing an inkjet head by a method for manufacturing the inkjet head of the present invention.

The apparatus is that for realizing a method called "meta mode process" which has been developed by OCLI (Optical Coating Laboratory Inc., USA) and used in preparing an anti-reflection film and an anti-fouling film used on a display or the like. As illustrated in FIG. 18, a Si sputter 202, an $O_2$ ion gun 203, a Nb sputter 204 and an Optool deposition 205, which are stations, are arranged at four sites around a drum 210, and they are all at a vacuum chamber. First, the Si sputter 202 is used to effect sputtering, and the $O_2$ ion gun 203 is then used to radiate $O_2$ ions to Si, thereby producing $SiO_2$. Thereafter, the Nb sputter 204 and the Optool deposition 205 are used to appropriately deposit Optool DSX. In manufacturing an anti-reflection film, the necessary number of Nb and $SiO_2$ are overlapped at a predetermined thickness and then deposited. Since the present invention does not require a function of the anti-reflection film, it is sufficient to paste $SiO_2$ and Optool DSX, with one layer each, without using Nb. As described above, this apparatus makes it possible to vacuum-deposit Optool DSX, as it is, at a vacuum chamber after formation of the $SiO_2$ thin film layer 122.

The ink repellent layer is preferably from 5 mN/m to 40 mN/m in critical surface tension and more preferably from 5 mN/m to 30 mN/m. Where the critical surface tension exceeds 30 mN/m, there is found a phenomenon that ink is excessively wet on a nozzle plate when used for a long time to result in a bend discharging of the ink or abnormal granulation after a repeated printing. Where it exceeds 40 mN/m, there is found a phenomenon that the ink is excessively wet on the nozzle plate from the beginning to result in a bend discharging of the ink or abnormal granulation from the beginning.

The ink-repellent materials listed in Table B were actually coated on an aluminum substrate, heated and dried to manufacture a nozzle place having an ink repellent layer. An ink repellent layer was measured for critical surface tension to obtain the results shown in Table 2.

In this instance, the critical surface tension can be measured by using the Zisman method. In other words, a liquid, the surface tension of which is known, is dropped on the ink repellent layer to measure the contact angle of θ, the surface tension of the liquid is plotted on the x axis and cos θ is plotted on the y axis, thereby obtaining a line on the downward side (Zisman Plot). When this line is to give Y=1 (θ=0), the surface tension can be calculated as a critical surface tension, γc. The critical surface tension can be measured also by such methods as Fowkes method, the Owens and Wendt method and the Van Oss method.

Further, a nozzle plate having an ink repellent layer was used to manufacture an inkjet head by a method similar to that for manufacturing the head. The cyan ink described below was used and jetted through the inkjet head. A shooting process of the ink was videotaped and observed to confirm that a normal granulation took place when either of the nozzle plates was used and discharge was also stable. The results are shown in Table B.

<Cyan Ink>

Copper phthalocyanine pigment-containing polymer fine particle dispersion of 20.0% by mass, 3-methyl 1,3-butane diol of 23.0% by mass, glycerin of 8.0% by mass, 2-ethyl-1,3-hexane diol of 2.0% by mass, FS-300 (manufactured by Dupont) of 2.5% by mass as a fluorochemical surfactant, Proxel LV (manufactured by Abecia Inc.) of 0.2% by mass as an anti-septic/anti-mildew agent, 2-amino-2-ethyl-1,3-propane diol of 0.5% by mass and an appropriate quantity of ion exchanged water were added to give 100% by mass, and, thereafter, the resultant was filtered through a membrane filter with an average pore size of 0.8 μm. The cyan ink was prepared by the above procedures.

TABLE B

| | Product name | Critical surface tension | Discharge stability |
|---|---|---|---|
| Dow Corning Toray Co., Ltd. | SR2411 | 21.6 mN/m | Favorable |
| Shin-Etsu Chemical Co., Ltd. | KBM7803 | 16.9 mN/m | Favorable |
| Shin-Etsu Chemical Co., Ltd. | KP801M | 6.6 mN/m | Favorable |

A frame 10, which is to form an ink supply port and engraved to give a common liquid chamber 12 in FIG. 6, is manufactured by resin molding.

In the thus constituted inkjet head, a driving wave pattern (pulse voltage of 10 V to 50 V) is applied to a driving portion 56 according to recording signals, by which the driving portion 56 is displaced toward a direction of lamination, and a pressure liquid chamber 22 is given pressure via a nozzle plate 30 to result in pressure elevation, thereby ink droplets are discharged from a nozzle 31.

Thereafter, when ink droplets are completely discharged, ink pressure inside the pressure liquid chamber 22 is decreased to develop a negative pressure inside the pressure liquid chamber 22 due to the inertia of ink flow and electrical discharge process of the driving pulse. The step is then moved to an ink filling step. In this instance, ink supplied from an ink tank flows into a common liquid chamber 12, passing a fluid resistance portion 21 through an ink flowing port 63 from the common liquid chamber and is filled into the pressure liquid chamber 22.

The fluid resistance portion 21 is effective in attenuating the residual pressure oscillation after the discharge but resistive to refill by utilizing the surface tension. An appropriate fluid resistance portion is selected, thereby the residual pressure is attenuated in conformity with the refill time, making it possible to shorten the time necessary for moving on to the next ink droplet discharging motion (driving cycle).

<Ink Record Matter>

An ink recorded matter made by the inkjet recording apparatus according to the inkjet recording method of the present invention is provided with an image formed on a recording medium by using the recording ink of the present invention.

The ink record matter is high in image quality, free of oozed ink and excellent in stability with the lapse of time, therefore, finding favorably a variety of applications as documents and others in which various types of printing and imaging are recorded.

EXAMPLES

Hereinafter, an explanation will be made for examples of the present invention. It should be, however, noted that the present invention is not restricted by the examples in any way.

Preparation Example 1

-Preparation of a Surface-treated Carbon Black Pigment Dispersion- 1 mol/L sodium persulfate was added to 100 g of carbon black having a primary particle size of 16 nm, specific surface area of 260 $m^2/g$, and DBP oil absorption of 69 mL/100 g (#960, manufactured by Mitsubishi Chemical Corporation), and the mixture was stirred at 80° C. for 10 hours so as to proceed with an oxidation treatment. Then, the resultant was washed with purified water and dried, thereafter, dispersed again in water and neutralized with sodium hydroxide so as to give pH of 7, with remaining salts being separated by an ultra-filter. Water to be added was adjusted so as to the pigment concentration of 20% by mass, and a membrane filter with a pore size of 0.8 μm was used to remove large particles therefrom.

The thus prepared dispersion was 1.35 mS/cm in electric conductivity and 123 nm in volume average particle size.

It is noted that the carbon black was measured for a volume average particle size by using Microtrac UPA (manufactured by Nikkiso Co., Ltd.).

Preparation Example 2

-Preparation of Surface-treated Carbon Black Pigment Dispersion- 1 mol/L sodium hypochlorite was added to 100 g of carbon black having a primary particle size of 16 nm, specific surface area of 260 m$^2$/g, and DBP oil absorption of 69 mL/100 g (#960, manufactured by Mitsubishi Chemical Corporation), and the mixture was stirred at 80° C. for 10 hours so as to proceed with an oxidation treatment. Then, the resultant was washed with purified water and dried, thereafter, dispersed again in water and neutralized with potassium hydroxide so as to give pH of 7, with remaining salts being separated by an ultra-filter. Water to be added was adjusted so as to attain the pigment concentrations of 20% by mass, and a membrane filter with a pore size of 0.8 μm was used to remove large particles.

The thus obtained dispersion was 1.3 mS/cm in electric conductivity and 128 nm in volume average particle size.

It is noted that the carbon black was measured for a volume average particle size by using Microtrac UPA (manufactured by Nikkiso Co., Ltd.).

Preparation Example 3

-Preparation of Surface-treated Carbon Black Pigment Dispersion-

3 L of purified water was added to 100 g of carbon black having a primary particle size of 16 nm, specific surface area of 260 m$^2$/g, and DBP oil absorption of 69 mL/100 g (#960, manufactured by Mitsubishi Chemical Corporation), and the mixture was stirred for 5 minutes. Then, ozone gas was introduced so as to proceed with an oxidation treatment for 1 hour. The resultant was washed with purified water and dried, thereafter, dispersed again in water and neutralized with sodium hydroxide so as to give pH of 7, with remaining salts being separated by an ultra-filter. Water to be added was adjusted so as to attain the pigment concentration of 20% by mass, and a membrane filter with a pore size of 0.8 μm was used to remove large particles.

The thus obtained dispersion was 1.25 mS/cm in electric conductivity and 132 nm in volume average particle size.

It is noted that the carbon black was measured for a volume average particle size by using Microtrac UPA (manufactured by Nikkiso Co., Ltd.).

Preparation Example 4

-Preparation of Surface-treated Carbon Black Pigment Dispersion- 1 mol/L sodium hypochlorite was added to 100 g of carbon black having a primary particle size of 16 nm, specific surface area of 260 m$^2$/g, and DBP oil absorption of 69 mL/100 g (#960, manufactured by Mitsubishi Chemical Corporation), and the mixture was stirred at 100° C. for 15 hours so as to proceed with an oxidation treatment. Then, the resultant was washed with purified water and dried, thereafter, dispersed again in water and neutralized with potassium hydroxide so as to give pH of 7, with remaining salts being separated by an ultra-filter. Water to be added was adjusted so as to attain the pigment concentration of 20% by mass, and a membrane filter with the pore size of 0.8 μm was used to remove large particles.

The thus obtained dispersion was 1.38 mS/cm in electric conductivity and 126 nm in volume average particle size.

It is noted that the carbon black was measured for a volume average particle size by using Microtrac UPA (manufactured by Nikkiso Co., Ltd.).

Preparation Example 5

-Preparation of Surface-treated Carbon Black Pigment Dispersion- 1 mol/L sodium persulfate was added to 100 g of carbon black having a primary particle size of 21 nm, specific surface area of 135 m$^2$/g, and DBP oil absorption of 53 mL/100 g (#7550, manufactured by Tokai Carbon Co., Ltd.), and the mixture was stirred at 80° C. for 10 hours so as to proceed with an oxidation treatment. Then, the resultant was washed with purified water and dried, thereafter, dispersed again in water and neutralized with sodium hydroxide so as to give pH of 7, with remaining salts being separated by an ultra-filter. Water to be added was adjusted so as to attain the pigment concentration of 20% by mass, and a membrane filter with a pore size of 0.8 μm was used to remove large particles.

The thus obtained dispersion was 1.2 mS/cm in electric conductivity and 61 nm in volume average particle size.

It is noted that the carbon black was measured for a volume average particle size by using Microtrac UPA (manufactured by Nikkiso Co., Ltd.).

Preparation Example 6

-Preparation of Surface-treated Carbon Black Pigment Dispersion- 1 mol/L sodium persulfate was added to 100 g of carbon black having a primary particle size of 24 nm, specific surface area of 120 m$^2$/g, and DBP oil absorption of 57 mL/100 g (MA8, manufactured by Mitsubishi Chemical Corporaton), and the mixture was stirred at 80° C. for 10 hours so as to proceed with an oxidation treatment. Then, the resultant was washed with purified water and dried, thereafter, dispersed again in water and neutralized with sodium hydroxide so as to give pH of 7, with remaining salts being separated by an ultra-filter. Water to be added was adjusted so as to attain the pigment concentration of 20% by mass, and a membrane filter with a pore size of 0.8 μm was used to remove large particles.

The thus obtained dispersion was 1.23 mS/cm in electric conductivity and 55 nm in volume average particle size.

It is noted that the carbon black was measured for a volume average particle size by using Microtrac UPA (manufactured by Nikkiso Co., Ltd.).

Preparation Example 7

-Preparation of Surface-treated Carbon Black Pigment Dispersion- 1 mol/L sodium persulfate was added to 100 g of carbon black having a primary particle size of 20 nm, specific surface area of 140 m$^2$/g, and DBP oil absorption of 131 mL/100 g (MA600, manufactured by Mitsubishi Chemical Corporation), and the mixture was stirred at 80° C. for 10 hours so as to proceed with an oxidation treatment. Then, the resultant was washed with purified water and dried, thereafter, dispersed again in water and neutralized with sodium hydroxide so as to give pH of 7, with remaining salts being separated by an ultra-filter. Water to be added was adjusted so as to attain the pigment concentration of 20% by mass, and a membrane filter with a pore size of 0.8 μm was used to remove large particles.

The thus obtained dispersion was 1.35 mS/cm in electric conductivity and 205 nm in volume average particle size.

It is noted that the carbon black was measured for a volume average particle size by using Microtrac UPA (manufactured by Nikkiso Co., Ltd.).

Example 1

An ink composition with the following formulation was prepared and triethanol amine was added so as to attain pH of 9. Thereafter, the composition was filtered by using a membrane filter with an average pore size of 0.8 μm to prepare ink.
<Ink Composition>
  Carbon black dispersion of Preparation Example 1: 9.0% by mass (solids content)
  1,5-pentane diol: 22.5% by mass
  Glycerin: 7.5% by mass
  Surfactant (Softanol EP 7025, manufactured by Nippon Shokubai Co., Ltd.): 1.0% by mass
  Ion exchanged water: 60.0% by mass Example 2

An ink composition with the following formulation was prepared and triethanol amine was added so as to attain pH of 9. Thereafter, the composition was filtered by using a membrane filter with an average pore size of 0.8 μm to prepare ink.
<Ink Composition>
  Carbon black dispersion of Preparation Example 2: 8.0% by mass (solids content)
  Acryl resin fine particles (Aquabrid 4720 manufactured by Daicel Chemical Industries, Ltd., volume average particle size=95 nm): 5.0% by mass (solids content)
  3-methyl-1,3-butane diol: 21.0% by mass
  Glycerin: 7.0% by mass
  Surfactant (Softanol EP 7025, manufactured by Nippon Shokubai Co., Ltd.): 1.0% by mass
  pH buffering agent expressed by the following formula (4): 0.1% by mass

formula (4)

Ion exchanged water: 57.9% by mass

Example 3

An ink composition with the following formulation was prepared and triethanol amine was added so as to attain pH of 9. Thereafter, the composition was filtered by using a membrane filter with an average pore size of 0.8 μm to prepare ink.
<Ink Composition>
  Carbon black dispersion of Preparation Example 5: 8.0% by mass (solids content)
  Acryl resin fine particles (Aquabrid 4720 manufactured by Daicel Chemical Industries, Ltd., volume average particle size=95 nm: 5.0% by mass (solids content)
  3-methyl-1,3-butane diol: 21.0% by mass
  Glycerin: 7.0% by mass
  Surfactant (Softanol EP 7025, manufactured by Nippon Shokubai Co., Ltd.): 1.0% by mass
  pH buffering agent expressed by the following formula (8): 0.1% by mass

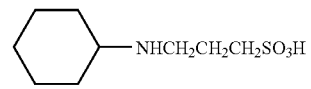

Formula 8

Ion exchanged water: 57.9% by mass

Example 4

An ink composition with the following formulation was prepared and triethanol amine was added so as to attain pH of 9. Thereafter, the composition was filtered by using a membrane filter with an average pore size of 0.8 μm to prepare ink.
<Ink Composition>
  Carbon black dispersion of Preparation Example 6: 8.0% by mass (solids content)
  Acryl resin fine particles (Aquabrid 4720 manufactured by Daicel Chemical Industries, Ltd., volume average particle size=95 nm): 5.0% by mass (solids content)
  3-methyl-1,3-butane diol: 21.0% by mass
  Glycerin: 7.0% by mass
  Surfactant (Softanol EP 7025, manufactured by Nippon Shokubai Co., Ltd.): 1.0% by mass
  Ion exchanged water: 58.0% by mass Example 5

An ink composition with the following formulation was prepared and triethanol amine was added so as to attain pH of 9. Thereafter, the composition was filtered by using a membrane filter with an average pore size of 0.8 μm to prepare ink.
<Ink Composition>
  Carbon black dispersion of Preparation Example 7: 8.0% by mass (solids content)
  Acryl resin fine particles (Aquabrid 4720 manufactured by Daicel Chemical Industries, Ltd., volume average particle size=95 nm): 5.0% by mass (solids content)
  3-methyl-1,3-butane diol: 21.0% by mass
  Glycerin: 7.0% by mass
  Surfactant (Softanol EP 7025, manufactured by Nippon Shokubai Co., Ltd.): 1.0% by mass
  Ion exchanged water: 58.0% by mass Example 6

An ink composition with the following formulation was prepared and triethanol amine was added so as to attain pH of 9. Thereafter, the composition was filtered by using a membrane filter with an average pore size of 0.8 μm to prepare ink.
<Ink Composition>
  Carbon black dispersion of Preparation Example 1: 14.0% by mass (solids content)
  Acryl resin fine particles (Aquabrid 4720 manufactured by Daicel Chemical Industries, Ltd., volume average particle size=95 nm): 2.0% by mass (solids content)
  1,3-butane diol: 21.0% by mass
  Glycerin: 7.0% by mass
  Surfactant (Softanol EP 7025, manufactured by Nippon Shokubai Co., Ltd.): 1.0% by mass
  Ion exchanged water: 55.0% by mass

Example 7

An ink composition with the following formulation was prepared and triethanol amine was added so as to attain pH of 9. Thereafter, the composition was filtered by using a membrane filter with an average pore size of 0.8 μm to prepare ink.
<Ink Composition>
　Carbon black dispersion of Preparation Example 1: 4.0% by mass (solids content)
　Acryl resin fine particles (Aquabrid 4720 manufactured by Daicel Chemical Industries, Ltd., volume average particle size=95 nm): 2.0% by mass (solids content)
　1,6-hexane diol: 24.0% by mass
　Glycerin: 8.0% by mass
　Surfactant (Softanol EP 7025, manufactured by Nippon Shokubai Co., Ltd.): 1.0% by mass
　Ion exchanged water: 61.0% by mass

Example 8

An ink composition with the following formulation was prepared and triethanol amine was added so as to attain pH of 9. Thereafter, the composition was filtered by using a membrane filter with an average pore size of 0.8 μm to prepare ink.
<Ink Composition>
　Carbon black dispersion of Preparation Example 1: 7.0% by mass (solids content)
　Acryl resin fine particles (Aquabrid 4720 manufactured by Daicel Chemical Industries, Ltd., volume average particle size=95 nm): 4.0% by mass (solids content)
　1,3-butane diol: 21.0% by mass
　Glycerin: 7.0% by mass
　Surfactant expressed by the formula (1) (m=2, n=10): 1.0% by mass
　Ion exchanged water: 61.0% by mass

Example 9

An ink composition with the following formulation was prepared and triethanol amine was added so as to attain pH of 9. Thereafter, the composition was filtered by using a membrane filter with an average pore size of 0.8 μm to prepare ink.
<Ink Composition>
　Carbon black dispersion of Preparation Example 1: 16.0% by mass (solids content)
　1,3-butane diol: 21.0% by mass
　Glycerin: 7.0% by mass
　Surfactant (Softanol EP 7025, manufactured by Nippon Shokubai Co., Ltd.): 1.0% by mass
　Ion exchanged water: 55.0% by mass

Example 10

An ink composition with the following formulation was prepared and sodium hydroxide was added so as to attain pH of 9. Thereafter, the composition was filtered by using a membrane filter with an average pore size of 0.8 μm to prepare ink.
<Ink Composition>
　Carbon black dispersion of Preparation Example 1: 7.0% by mass (dry solid basis)
　Acryl resin fine particles (Aquabrid 4720 manufactured by Daicel Chemical Industries, Ltd., volume average particle size=95 nm): 4.0% by mass (solids content)
　1,3-butane diol: 21.0% by mass
　Glycerin: 7.0% by mass
　Surfactant (Softanol EP 7025, manufactured by Nippon Shokubai Co., Ltd.): 1.0% by mass
　Ion exchanged water: 60.0% by mass

Comparative Example 1

An ink composition with the following formulation was prepared and triethanol amine was added so as to attain pH of 9. Thereafter, the composition was filtered by using a membrane filter with an average pore size of 0.8 μm to prepare ink.
<Ink Composition>
　Carbon black dispersion of Preparation Example 3: 6.0% by mass (solids content)
　3-methyl-1,3-butane diol: 21.0% by mass
　Glycerin: 7.0% by mass
　Surfactant (Softanol EP 7025, manufactured by Nippon Shokubai Co., Ltd.): 1.0% by mass
　Ion exchanged water: 63.0% by mass

Comparative Example 2

An ink composition with the following formulation was prepared and triethanol amine was added so as to attain pH of 9. Thereafter, the composition was filtered by using a membrane filter with an average pore size of 0.8 μm to prepare ink.
<Ink Composition>
　Carbon black dispersion of Preparation Example 4: 8.0% by mass (solids content)
　3-methyl-1,3-butane diol: 21.0% by mass
　Glycerin: 7.0% by mass
　Surfactant (Softanol EP 7025, manufactured by Nippon Shokubai Co., Ltd.): 1.0% by mass
　Ion exchanged water: 62.0% by mass

Comparative Example 3

Carbon black A (#47 manufactured by Mitsubishi Chemical Corporation): 15% by mass
　Joncryl 68 (manufactured by Johnson polymer Co., Ltd.): 5% by mass
　Glycerin: 10% by mass
　Ion exchanged water: 70% by mass The above materials were dispersed with glass beads in a sand mill for 3 hours, and then filtered through a membrane filter with an average pore size of 5 μm to obtain a carbon black dispersion A.

Using the obtained carbon black dispersion A, an ink composition with the following formulation was prepared and triethanol amine was added so as to attain pH of 9. Thereafter, the composition was filtered through a membrane filter with an average pore size of 0.8 μm to prepare ink.
<Ink Composition>
　Carbon black dispersion A: 7.0% by mass (solids content)
　1,3-butane diol: 22.5% by mass
　Glycerin: 7.5% by mass
　Surfactant (Softanol EP 7025, manufactured by Nippon Shokubai Co., Ltd.): 1.0% by mass
　2,2,4-trimethyl-1,3pentanediol: 2.0% by mass
　Ion exchanged water: 67% by mass Each of the thus obtained recording ink was evaluated for various properties as shown below. Tables 1 to 4 show each of the ink formulations and the results.
<Volume Average Particle Size of Ink>
　Each recording ink was diluted with purified water and measured for a volume average particle size (D50%) by using a particle size distribution measuring device (Microtrac UPA, manufactured by Nikkiso Co., Ltd.).

<Viscosity of Ink>

Measurement was made for the viscosity at 25° C. by using RL-500 (manufactured by Toki Sangyo Co., Ltd.).

<Surface Tension of Ink>

Measurement was made for the surface tension at 23° C.±2° C. by using a static surface tension balance (BVP-Z, manufactured by Kyowa Interface Science Co., Ltd.).

<pH of Ink>

Measurement was made for the pH at 23° C.±2° C. by using a pH meter (HM-A, manufactured by DKK-Toa Corporation).

<Imaging Test>

Each of the thus obtained recording ink was used to test the imaging performance by using the inkjet printer shown in FIG. 3 through FIG. 7. A silicone resin film (room-temperature curing silicone resin SR 2411, manufactured by Dow Corning Toray Co., Ltd.) was formed on the surface of the nozzle plate of the inkjet printer, with a thickness of 1.2 μm, surface roughness (Ra) of 0.18 μm and critical surface tension of 21.6 mN/m. The imaging test was conducted at the superfine mode by using high-grade plain paper under conditions of 23° C. and 50% RH. Further, the head driving wave pattern was adjusted so that the ink can be discharged at a constant quantity.

<Image Density>

The inkjet printer shown in FIG. 3 to FIG. 7 in which each recording ink prepared in Examples 1 through 10 and Comparative Examples 1 through 3 was filled was used to print on type 6200 paper (manufactured by NBS Ricoh Co., Ltd.) at a resolution of 600 dpi. After drying, measurement was made for the image density by using a reflection-type color spectrophotometer (manufactured by X-Rite).

<Fixing Property>

The inkjet printer shown in FIG. 3 to FIG. 7 in which each recording ink prepared in Examples 1 through 10 and Comparative Examples 1 through 3 was filled was used to print on type 6200 paper (manufactured by NBS Ricoh Co., Ltd.) at a resolution of 600 dpi. After drying, printed parts were rubbed with a cotton cloth ten times, and pigment transferred to the cotton cloth was macroscopically observed and evaluated on the basis of the following criteria.

[Evaluation Criteria]

A: Substantially no pigment is transferred to the cotton cloth.

B: Pigment is transferred to some extent.

C: Pigment is clearly transferred.

<Continuous Discharge Property>

The inkjet printer shown in FIG. 3 to FIG. 7 in which each recording ink prepared in Examples 1 through 10 and Comparative Examples 1 through 3 was filled was used to print on type 6200 paper (manufactured by NBS Ricoh Co., Ltd.) at a resolution of 600 dpi. The printing was conducted continuously on 200 sheets of the paper to evaluate the discharge disturbance and discharge failure on the basis of the following criteria.

[Evaluation Criteria]

A: No discharge disturbance or discharge failure is found.

B: Discharge disturbance or discharge failure is found in three or less nozzles.

C: Discharge disturbance or discharge failure is found in four or more nozzles.

<Discharge Property after Ink is Allowed to Stand in the Atmosphere>

The inkjet printer shown in FIG. 3 to FIG. 7 in which each recording ink prepared in Examples 1 through 10 and Comparative Examples 1 through 3 was filled was used to conduct an all color cleaning. Thereafter, the ink was allowed to stand under the conditions of 32° C. and 30% RH for one month. Then, nozzles were checked for the printing performance to evaluate discharge disturbance and discharge failure on the basis of the following criteria.

[Evaluation Criteria]

A: No discharge disturbance or discharge failure is found.

B: Discharge disturbance or discharge failure is found in three or less nozzles.

C: Discharge disturbance or discharge failure is found in four or more nozzles.

<Storage Stability of Ink>

Recording ink prepared in Examples 1 through 10 and Comparative Examples 1 through 3 were filled into cartridges and stored at 60° C. for two weeks. Observation was made for an increased viscosity of the ink and change in pH.

It is noted that the increased viscosity was defined as (increased viscosity of ink, %)=[(viscosity after storage)/(viscosity before storage)−1]×100.

<Printing Suitability of Ink for Printing Coated Paper>

The inkjet printer shown in FIG. 3 to FIG. 7 in which each recording ink prepared in Examples 1 through 12 and Comparative Examples 1 through 3 was filled was used to print on a matt paper (Hokuetsu Paper Mills, Ltd.) at a resolution of 600 dpi. Evaluation was made for blurred characters and variance in color at a solid part.

It is noted that the α matt paper was measured for a quantity of purified water transferred to a recording medium at the contact time of 100 ms by using a dynamic scanning absorptometer (DSA, manufactured by Kyowa Seiko Co., Ltd.), finding that the quantity was 3.6 mL/m$^2$.

[Evaluation Criteria for Blurred Characters]

A: Characters are very clearly printed, with no blur found.

B: Characters are printed less clearly, with some blur found.

C: Characters are not clearly printed, with a marked blur found.

[Evaluation Criteria for Variance in Color at Solid Part]

A: Image is clear, with substantially no variance in color.

B: Image is relatively poor in clearness, with some variance in color.

C: Image is not clear, with a marked variance in color.

<Concentration of Humic Acid>

At first, column chromatography was performed to remove additives such as a surfactant, a rust-preventive agent and an ultraviolet absorbing agent from the recording ink prepared in Examples 1 through 10 and Comparative Examples 1 through 3 and recovered a carbon black. The thus obtained carbon black was subjected to vacuum drying by using a dryer at 50° C. for sufficient evaporation of water and solvent and then diluted with water to a concentration of 20% by mass. Fifty grams of the diluted solution was measured in a beaker, and passed through an ultra-filter (Pellicon Biomax 50, manufactured by Millipore) for 30 minutes to obtain a brown liquid. This liquid was diluted 10 times with ion exchanged water and read on a spectrophotometer (U-3310, manufactured by Hitachi High-Technologies Corporation) equipped with a quartz cell (light path length of 10 mm) at a wavelength of 230 nm to 260 nm. The thus obtained maximum absorbance was increased 10 times to determine the concentration of humic acid.

<Concentration of Alkali Metals>

Recording ink prepared in Examples 1 through 10 and Comparative Examples of 1 through 3 was diluted 10 times with ion exchanged water and measured for concentrations of sodium and potassium contained in the ink by using a high-frequency induction plasma emission analyzer (ICP-1000IV, manufactured by Shimadzu Corporation). The thus obtained values were respectively multiplied by 10 times and totaled to give the concentration of alkali metals.

<Increased Viscosity of Ink on Water Evaporation>

A predetermined quantity of the ink prepared in Examples 1, 5, 7, 9 and Comparative Examples of 1 through 3 was allowed to stand under the conditions of 50° C. and 10% humidity, and measured for a change in ink mass after the passage of a certain time and the viscosity at 25° C. It is noted that a quantity of water evaporation and an increased viscosity relative to an initial viscosity were determined by the following formulae.

(Quantity of water evaporation [%])=[(mass of initial ink)−(mass of ink after water evaporation)]/(mass of initial ink)×100

(Increased viscosity relative to initial viscosity)=(viscosity of ink after water evaporation)/(initial viscosity)

Figure 19:
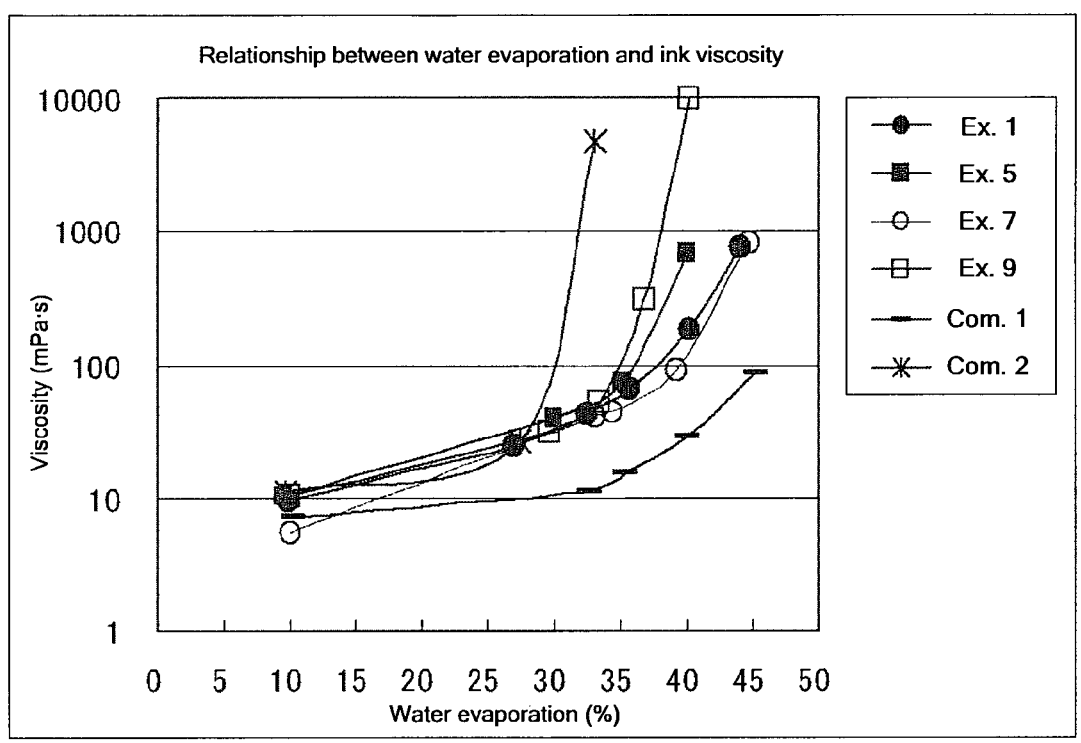
FIG. 19 is a view for showing a relationship between a quantity of water evaporation and ink viscosity.

FIG. 19 shows a relationship between the quantity of water evaporation (%) and the viscosity of ink (mPa·s).

Further, Table 5 shows an increased viscosity relative to the initial viscosity when the water evaporation rate is from 34% by mass to 41% by mass.

TABLE 3

|  | Comparative Example 1 | Comparative Example 2 |
|---|---|---|
| Dispersion of Preparation Example 1 | | |
| Dispersion of Preparation Example 2 | | |
| Dispersion of Preparation Example 3 | 6 | |
| Dispersion of Preparation Example 4 | | 8 |
| Dispersion of Preparation Example 5 | | |
| Dispersion of Preparation Example 6 | | |
| Dispersion of Preparation Example 7 | | |
| Acrylic resin | | |
| 1,3-butanediol | | |
| 1,5-pentanediol | | |
| 3-methyl-1,3-butanediol | 21 | 21 |
| 1,6-hexanediol | | |
| Glycerin | 7 | 7 |
| 2-ethyl-1,3 hexanediol | | |
| Nonionic surfactant | 1 | 1 |
| Fluorochemical surfactant (I) | | |
| pH buffering agent (4) | | |
| pH buffering agent (8) | | |
| Ion exchanged water | 63 | 62 |
| Total | 100 | 100 |

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Dispersion of Preparation Ex. 1 | 9 | | | | | 14 | 4 | 7 | 16 | 7 |
| Dispersion of Preparation Ex. 2 | | 8 | | | | | | | | |
| Dispersion of Preparation Ex. 3 | | | | | | | | | | |
| Dispersion of Preparation Ex. 4 | | | | | | | | | | |
| Dispersion of Preparation Ex. 5 | | | 8 | | | | | | | |
| Dispersion of Preparation Ex. 6 | | | | 8 | | | | | | |
| Dispersion of Preparation Ex. 7 | | | | | 8 | | | | | |
| acrylic resin | | 5 | 5 | 5 | 5 | 2 | 2 | 4 | | 4 |
| 1,3-butanediol | | | | | | 21 | | 21 | 21 | 21 |
| 1,5-pentanediol | 22.5 | | | | | | | | | |
| 3-methyl-1,3-butanediol | | 21 | 21 | 21 | 21 | | | | | |
| 1,6-hexanediol | | | | | | | 24 | | | |
| gryceline | 7.5 | 7 | 7 | 7 | 7 | 7 | 8 | 7 | 7 | 7 |
| 2-ethyl-1,3-hexanediol | | | | | | | | | | |
| nonionic surfactant | 1 | 1 | 1 | 1 | 1 | 1 | 1 | | 1 | 1 |
| fluorochemical surfactant (I) | | | | | | | | 1 | | |
| pH buffering agent (4) | | 0.1 | | | | | | | | |
| pH buffering agent (8) | | | 0.1 | | | | | | | |
| ion-exchanged water | 60 | 57.9 | 57.9 | 58 | 58 | 55 | 61 | 60 | 55 | 60 |
| total | 100 | 100 | 100 | 100 | 100 | 100 | 100 | 100 | 100 | 100 |

TABLE 2

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Viscosity (mPa·s) | 7.56 | 8.2 | 7.95 | 7.64 | 8.13 | 18.78 | 3.85 | 8.62 | 20.3 | 8.56 |
| Volume average particle size (nm) | 125.6 | 126.5 | 62.5 | 58.1 | 201.4 | 125.3 | 125.1 | 125.2 | 126.8 | 125.6 |
| Surface tension | 31.2 | 30.5 | 30.8 | 31.2 | 30.7 | 31.5 | 31 | 25.6 | 31.2 | 31.2 |
| Concentration of humic acid | 14.2 | 12.9 | 11.2 | 12.5 | 13.4 | 14 | 13.2 | 14.4 | 14 | 13.6 |
| Concentration of alkali metal (ppm) | 890 | 1190 | 960 | 980 | 960 | 1480 | 370 | 860 | 1520 | 1720 |
| pH | 9 | 9 | 9 | 9 | 9 | 9 | 9 | 9 | 9 | 9 |
| Plane paper OD | 1.47 | 1.46 | 1.44 | 1.44 | 1.47 | 1.48 | 1.4 | 1.45 | 1.45 | 1.45 |
| Fixing ability on plane paper | B | A | A | A | A | A | A | A | B | A |
| Blurred characters on coated printing paper | A | A | A | A | A | A | A | A | A | A |
| Color variance on coated printing paper | A | A | A | A | A | A | A | A | B | A |
| Continuous discharge property | A | A | A | A | B | A | A | A | B | B |
| Discharge property after ink is allowed to stand in the atmosphere | A | A | A | A | B | A | A | A | B | B |
| Increased viscosity after storage (%) | 1.8 | 2.6 | 2.4 | 2.4 | 2.1 | 4.5 | 0.6 | 2.6 | 5.8 | 8.4 |
| pH after storage | 8.76 | 8.95 | 8.92 | 8.72 | 8.72 | 8.68 | 8.85 | 8.75 | 8.42 | 8.78 |

TABLE 4

|  | Comparative Example 1 | Comparative Example 2 | Comparative Example 3 |
|---|---|---|---|
| Viscosity (mPa · s) | 6.1 | 7.42 | 6.0 |
| Volume average particle size (nm) | 132.1 | 125.6 | 101.3 |
| Surface tension | 31 | 30.8 | 30.5 |
| Concentration of humic acid | 3 | 30.7 | 0 |
| Concentration of alkali metal (ppm) | 850 | 920 | 120 |
| pH | 9 | 9 | 9 |
| Plain paper OD | 1.35 | 1.45 | 1.26 |
| Fixing property on plain | B | B | C |
| Blurred characters on coated printing paper | B | B | B |
| Color variance on coated printing paper | B | B | C |
| Continuous discharge | B | C | C |
| Discharge property after ink is allowed to stand in the atmosphere | B | C | B |
| Increased viscosity after storage (%) | 4 | 8.9 | 30 |
| pH after storage | 8.8 | 8.4 | 8.9 |

TABLE 5

|  | Water evaporation rate (%) | Initial viscosity (mPa · s) | Viscosity after water evaporation (mPa · s) | Increased viscosity relative to initial viscosity (time) |
|---|---|---|---|---|
| Example 1 | 35.6 | 7.56 | 65.1 | 8.6 |
|  | 40.1 | 7.56 | 186.0 | 24.6 |
| Example 5 | 35.2 | 8.13 | 75.0 | 9.2 |
|  | 40.0 | 8.13 | 675.0 | 83.0 |
| Example 7 | 34.4 | 3.85 | 44.6 | 11.6 |
|  | 40.2 | 3.85 | 89.0 | 23.1 |
| Example 9 | 36.8 | 18.78 | 308.4 | 16.4 |
|  | 40.2 | 18.78 | 10000.0 | 532.5 |
| Comparative Example 1 | 35.3 | 6.10 | 15.6 | 2.6 |
|  | 40.0 | 6.10 | 28.4 | 4.7 |
| Comparative Example 2 | 34.0 | 7.42 | 10000.0 | 1347.7 |
| Comparative Example 3 | 34.1 | 6.00 | 3865 | 644 |

Production Example A

-Production of Support-

A support having a basis weight of 79 g/m² was produced by papermaking a slurry containing 0.3% by mass of the following formulation using a fourdrinier papermaking machine. In a size press step of the papermaking process, an aqueous solution of oxidized starch was applied to a surface of the support such that the deposited solid amount is 1.0 g/m² per one surface.

- Broad-leaved wood bleached kraft pulp (LBKP): 80 parts by mass
- Coniferous wood bleached kraft pulp (NBKP): 20 parts by mass
- Precipitated calcium carbonate (product name: TP-121, manufactured by Okutama Kogyo Co., Ltd.): 10 parts by mass
- Aluminum sulfate: 1.0 part by mass
- Amphoteric starch (product name: Cato3210, manufactured by Nippon NSC Ltd.): 1.0 part by mass
- Neutral rosin sizing agent (product name: NeuSize M-10, manufactured by HARIMA CHEMICALS, INC.): 0.3 parts by mass
- Retention aid (product name: NR-11LS, manufactured by HYMO Co., Ltd.): 0.02 parts by mass Production Example B -Production of Recording Medium 1-

As a pigment 70 parts by mass of clay containing 97% by mass of particles having a particle diameter of 2 µm or less, 30 parts by mass of heavy calcium carbonate having an average particle diameter of 1.1 µm, as an adhesive 8 parts by mass of styrene-butadiene copolymer emulsion having a glass transition temperature (Tg) of −5° C., 1 part by mass of phosphated starch, as an auxiliary agent 0.5 parts by mass of calcium stearate, and water were mixed together to prepare a coating solution containing 60% by mass of solid content.

The obtained coating solution was applied on both sides of the prepared substrate using a blade coater such that the deposited solid amount is 8 g/m² per one surface, dried with hot air, and supercalendered to prepare "Recording Medium 1".

Production Example C

-Production of Recording Medium 2-

As a pigment 70 parts by mass of clay containing 97% by mass of particles having a particle diameter of 2 µm or less, 30 parts by mass of heavy calcium carbonate having an average particle diameter of 1.1 µm, as an adhesive 7 parts by mass of styrene-butadiene copolymer emulsion having a glass transition temperature (Tg) of −5° C., 0.7 parts by mass of phosphated starch, as an auxiliary agent 0.5 parts by mass of calcium stearate, and water were mixed together to prepare a coating solution containing 60% by mass of solid content.

The obtained coating solution was applied on both sides of the prepared substrate using a blade coater such that the deposited solid amount is 8 g/m² per one surface, dried with hot air, and supercalendered to prepare "Recording Medium 2".

Production Example D

-Production of Recording Medium 3-

A coated paper for gravure printing (product name: Space DX, a basis weight of 56 g/m², manufactured by Nippon Paper Industries Co., Ltd.) was used.

Production Example E

-Production of Recording Medium 4-

A coat paper for offset printing (product name: Aurora Coat, a basis weight of 104.7 g/m², manufactured by Nippon Paper Industries Co., Ltd.) was used.

Production Example F

-Production of Recording Medium 5-

A matte coated paper for inkjet printing (product name: SuperFine paper, manufactured by SEIKO EPSON Corp.) was used.

Next, the quantity of each of inks in Examples 3 and 5 transferred to the recording media 1 through 5 was measured by using a dynamic scanning absorptometer as follows:

Beading, blur characters, drying property and OD value of an image printed in each recording medium were evaluated. The results were shown in Tables 6 and 7.

<Measuring Quantity of Transferred Ink by Dynamic Scanning Absorptometer>

A dynamic scanning absorptometer (K350 series D type, manufactured by Kyowa Seiko Co., Ltd.) was used to measure the quantities of transferred inks of Examples 3 and 5. Quantities transferred at the contact time of 100 ms and at the contact time of 400 ms could be determined by interpolating measurements of the quantities transferred at adjacent contact times of the respective contact times. The measurements were made at 23° C. and RH of 50%.

<Beading>

The inks of Examples 3 and 5 were printed on the recording media 1 through 5 at a resolution of 600 dpi, and beading was visually observed.

[Evaluation Criteria]
4: Substantially no beading and uniform printing
3: Slightly beading is observed.
2: Clearly beading is observed.
1: Outstandingly beading is observed.

<Blur Characters>

The inks of Examples 3 and 5 were printed on the recording media 1 to 5 at a resolution of 600 dpi, and blur characters was visually observed.

[Evaluation Criteria]
4: Substantially no blur and clear printing
3: Slightly blur is observed.
2: Clearly blur is observed.
1: Outstandingly blur is observed.

<Drying Property>

The inks of Examples 3 and 5 were printed on the recording media 1 through 5 at a resolution of 600 dpi.

Immediately after printing, a plain paper type 6200 paper (manufactured by NBS Ricoh Co., Ltd.) was put on printed parts, and pressed with a finger and then visually observed a degree of transferred on the plain paper.

[Evaluation Criteria]
4: No transfer is observed.
3: Slightly transfer is observed.
2: Clearly transfer is observed.
1: Outstandingly transfer is observed.

<Image Density>

The inks of Examples 3 and 5 were printed on the recording media 1 through 5 at a resolution of 600 dpi. An image density of a solid image was measured by a color reflection densitometer X-Rite938.

TABLE 6

| Media | Example: 3 black ink | | | | | |
|---|---|---|---|---|---|---|
| | deposited solid amount ($g/m^2$) | 100 ms ($ml/m^2$) | 400 ms ($ml/m^2$) | Blur | Beading | Drying property | OD |
| Recording medium 1 | 1.0 | 6.8 | 14 | 4 | 4 | 4 | 1.82 |
| Recording medium 2 | 8.0 | 13.2 | 18 | 4 | 4 | 4 | 1.8 |
| Recording medium 3 | 50.0 | 5.6 | 7.8 | 4 | 4 | 4 | 1.84 |
| Recording medium 4 | 104.7 | 2 | 2.9 | 3 | 3 | 2 | 1.78 |
| Recording medium 5 | N/A | 36.2 | 43.5 | 3 | 4 | 4 | 1.7 |

TABLE 7

| Media | Example 5: black ink | | | | | |
|---|---|---|---|---|---|---|
| | deposited solid amount ($g/m^2$) | 100 ms ($ml/m^2$) | 400 ms ($ml/m^2$) | Blur | Beading | Drying property | OD |
| Recording medium 1 | 1.0 | 7.5 | 15.2 | 4 | 4 | 4 | 1.85 |
| Recording medium 2 | 8.0 | 14.8 | 19.7 | 4 | 4 | 4 | 1.82 |
| Recording medium 3 | 50.0 | 6.5 | 8.8 | 4 | 4 | 4 | 1.86 |
| Recording medium 4 | 104.7 | 2.4 | 3 | 3 | 3 | 2 | 1.8 |
| Recording medium 5 | N/A | 37.6 | 46.1 | 3 | 4 | 4 | 1.73 |

INDUSTRIAL APPLICABILITY

The recording ink of the present invention is excellent in fixing property and image density on a recording medium and also excellent in stability after a prolonged storage and able to form a high-quality image not only on plain paper or paper exclusively used for inkjet printing but also on coated paper for commercial printing poor in water absorption, thereby favorably applicable to an inkjet recording apparatus.

Further, the inkjet recording apparatus and the inkjet recording method of the present invention are applicable to various types of recording by an inkjet recording method, and in particular preferably applicable, for example, to an inkjet recording printer, a facsimile device, a copying device, and a multifunction device of printer/facsimile/copier.

The invention claimed is:

1. A recording ink comprising:
water;
a water-soluble organic solvent;
a surfactant; and
a carbon black having a hydrophilic group on a surface thereof, wherein at least a part of a terminal of the hydrophilic group on the carbon black is substituted with an alkali metal, wherein a quantity of the alkali metal contained in the recording ink is from 100 ppm or more to 1500 ppm or less,
wherein the carbon black releases humic acid in an aqueous dispersion of the carbon black, which is recovered from the recording ink, a concentration of the humic acid released in the aqueous dispersion containing 20% by mass of the carbon black is expressed with a maximum absorbance at a wavelength of 230 nm to 260 nm, and the recording ink has the maximum absorbance of 5.0 to 20.0 at the wavelength of 230 nm to 260 nm.

2. The recording ink according to claim 1, wherein a content of the carbon black is from 5% by mass to 15% by mass with respect to the total amount of the recording ink.

3. The recording ink according to claim 1, wherein the recording ink has a ratio B/A of from 5.0 or more to less than 550 when the recording ink has a water evaporation rate of 34% by mass to 41% by mass relative to a total mass of the recording ink, where A is an initial viscosity of the recording ink and B is a viscosity after water evaporation.

4. The recording ink according to claim 1, further comprising a pH buffering agent.

5. The recording ink according to claim 4, wherein the pH buffering agent is at least one organic pH buffering agent selected from Good's buffer solutions.

6. The recording ink according to claim 1, wherein the carbon black having a hydrophilic group has a volume average particle size of from 60 nm to 200 nm at the time being dispersed in water.

7. The recording ink according to claim 1, further comprising resin fine particles having a volume average particle size of from 50 nm to 200 nm.

8. The recording ink according to claim 1, wherein the recording ink has a viscosity of 6 mPa·s to 20 mPa·s at 25° C.

9. An inkjet recording method comprising:
applying a stimulus to a recording ink, and ejecting the recording ink from a recording head so as to form an image on a recording medium,
wherein the recording head is configured to have an ink discharge opening on a face of a nozzle plate, and to have an ink repellent layer formed on the face of the nozzle plate where the ink discharge opening is placed, and
wherein the recording ink comprises:
water;
a water-soluble organic solvent;
a surfactant; and
a carbon black having a hydrophilic group on a surface thereof, wherein at least a part of a terminal of the hydrophilic group on the carbon black is substituted with an alkali metal, wherein a quantity of the alkali metal contained in the recording ink is from 100 ppm or more to 1500 ppm or less,
wherein the carbon black releases humic acid in an aqueous dispersion of the carbon black, which is recovered from the recording ink, a concentration of the humic acid released in the aqueous dispersion containing 20% by mass of the carbon black is expressed with a maximum absorbance at a wavelength of 230 nm to 260 nm, and the recording ink has the maximum absorbance of 5.0 to 20.0 at the wavelength of 230 nm to 260 nm.

10. The inkjet recording method according to claim 9, wherein the stimulation is at least one selected from the group consisting of heat, pressure, vibration and light.

11. The inkjet recording method according to claim 9, wherein the ink repellent layer comprises either a fluorine-based material or a silicone-based material.

12. The inkjet recording method according to claim 9, wherein the ink repellent layer has a critical surface tension γc of from 5 mN/m to 40 mN/m.

13. The inkjet recording method according to claim 9, wherein the recording medium has a support and a coating layer at least on one face of the support.

14. The inkjet recording method according to claim 9, wherein the recording medium has a purified water transfer amount of 2 mL/m$^2$ to 45 ml/m$^2$ when measured at 23° C. and 50% RH for a contact time of 100 ms by using a dynamic scanning absorptometer, and has a purified water transfer amount of 3 mL/m$^2$ to 50 mL/m$^2$ when measured at 23° C. and 50% RH for the contact time of 400 ms by using a dynamic scanning absorptometer.

15. The inkjet recording method according to claim 13, wherein an applied amount of the coating layer is from 0.5 g/m$^2$ to 20.0 g/m$^2$ on a dry basis.

16. The inkjet recording method according to claim 9, wherein the recording medium has a basis weight of 50 g/m$^2$ to 250 g/m$^2$.

17. An inkjet recording apparatus comprising:
an ink ejecting unit configured to apply a stimulus to a recording ink, and to eject the recording ink so as to record an image on a recording medium, wherein the recording ink comprises:
water;
a water-soluble organic solvent;
a surfactant; and
a carbon black having a hydrophilic group on a surface thereof, wherein at least a part of a terminal of the hydrophilic group on the carbon black is substituted with an alkali metal, wherein a quantity of the alkali metal contained in the recording ink is from 100 ppm or more to 1500 ppm or less,
wherein the carbon black releases humic acid in an aqueous dispersion of the carbon black, which is recovered from the recording ink, a concentration of the humic acid released in the aqueous dispersion containing 20% by mass of the carbon black is expressed with a maximum absorbance at a wavelength of 230 nm to 260 nm, and the recording ink has the maximum absorbance of 5.0 to 20.0 at the wavelength of 230 nm to 260 nm.

18. The inkjet recording apparatus according to claim 17, wherein the stimulus is at least one selected from the group consisting of heat, pressure, vibration and light.

* * * * *